United States Patent
Yang

(10) Patent No.: US 10,102,435 B2
(45) Date of Patent: Oct. 16, 2018

(54) LANE DEPARTURE WARNING SYSTEM AND ASSOCIATED METHODS

(71) Applicant: OmniVision Technologies, Inc., Santa Clara, CA (US)

(72) Inventor: Lei Yang, Sunnyvale, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 93 days.

(21) Appl. No.: 15/233,675

(22) Filed: Aug. 10, 2016

(65) Prior Publication Data

US 2018/0046867 A1 Feb. 15, 2018

(51) Int. Cl.
*G06K 9/00* (2006.01)
*B60R 1/00* (2006.01)
*G06K 9/32* (2006.01)
*G06K 9/62* (2006.01)

(52) U.S. Cl.
CPC .......... *G06K 9/00798* (2013.01); *B60R 1/00* (2013.01); *G06K 9/3233* (2013.01); *G06K 9/6212* (2013.01); *G06K 9/6215* (2013.01); *B60R 2300/804* (2013.01)

(58) Field of Classification Search
CPC .......... G06K 9/00798; G05D 1/0246; G05D 2201/0213; B60T 2201/08; B60T 2201/089
USPC ....... 382/103, 104; 348/113, 148; 701/1, 23; 340/907
See application file for complete search history.

(56) References Cited

U.S. PATENT DOCUMENTS 6,728,412 B1 4/2004 Vasylyev
6,823,241 B2 * 11/2004 Shirato ............... G06K 9/4609
701/1

(Continued)

FOREIGN PATENT DOCUMENTS

TW 200922816 A 6/2009

OTHER PUBLICATIONS

Radu Danescu et al., Robust Real-Time Lane Delimiting Features Extraction, paper for Technical University of Cluj Napoca; 2006; 6 pages.

(Continued)

*Primary Examiner* — Charlotte M Baker
(74) *Attorney, Agent, or Firm* — Lathrop Gage LLP

(57) ABSTRACT

A lane departure warning system includes a memory and a processor for validating a candidate region as including an image of a lane marker on the road is disclosed. The candidate region is identified within a latest road image of a temporal sequence of road images captured from the front of a vehicle traveling along a road. The memory stores non-transitory computer-readable instructions and adapted to store the road image. The image processor is adapted to execute the instructions to, when no previously-verified region and no previously-rejected region aligns with the candidate region: (i) determine a minimum distance between the candidate region and a previously-verified region of a previously-captured road image of the sequence, (ii) when the minimum distance exceeds a threshold distance, store the candidate region as a verified region, and (iii) when the minimum distance is less than the threshold distance, store the candidate region as a rejected region.

20 Claims, 20 Drawing Sheets

(56) References Cited

U.S. PATENT DOCUMENTS

| | | | |
|---|---|---|---|
| 7,346,190 B2* | 3/2008 | Taniguchi | G06K 9/00798 340/907 |
| 8,305,445 B2* | 11/2012 | Mori | G06K 9/00798 348/148 |
| 2010/0309674 A1 | 12/2010 | Su et al. | |
| 2011/0298602 A1 | 12/2011 | Chen et al. | |
| 2013/0202155 A1 | 8/2013 | Karanam | |
| 2015/0248771 A1 | 9/2015 | Kim | |
| 2017/0177951 A1* | 6/2017 | Yang | G06K 9/00798 |

OTHER PUBLICATIONS

Anjali Goel; Lane Detection Techniques—A Review; IJCSMC, vol. 3 Issue 2, Feb. 2014; p. 596-602.

R. G. Lotte; Roads Centre-Axis Extraction in Airborne SAR Images: An Approach Based on Active Contour Model With the Use of Semi-Automatic Seeding; IAPRSSIS, vol. XL-1/W1, May 2013. pp. 207-212.

Gurveen Kaur et al.; Lane Detection Techniques: A Review; Int'l Journal of Computer Applications vol. 112, No. 10, Feb. 2015; pp. 4-8.

Ju-Young Kim et al.; A simple model for a lane detection system; SPIE, 2011. 3 pages.

Sushil Kumar Singh et al; Various Methods for Edge Detection in Digital Image Processing; IJCST, vol. 2, Issue 2, Jun. 2011. pp. 188-190.

Xiaoyun Wang et al.; Robust Lane Detection Based on Gradient-Pairs Constraint; Proceedings of the 30th Chinese Control Conference; Jul. 2011. pp. 3181-3185.

Lopez, A. et al.; Robust Lane Markings Detection and Road Geometry Computation; Intl. Journal of Automotive Technology, 11(3): 395-407, 2010; revised Apr. 2, 2009; 14 pages.

Aly, M.; Real time detection of lane markers in urban streets, 2008 IEEE Intelligent Vehicles Symposium; pp. 7-12, 2008.

Yang et al. (2004) "Lane detection and tracking using B-Snake," Image and Vision Computing. 22(4):269-280.

Non-Final Rejection corresponding to U.S. Appl. No. 14/978,873, dated Apr. 20, 2017, 19 pages.

Final Rejection corresponding to U.S. Appl. No. 14/978,873, dated Aug. 24, 2017, 23 pgs.

Office Action corresponding to Taiwanese Patent Application No. 105138925, dated Jul. 11, 2017.

* cited by examiner

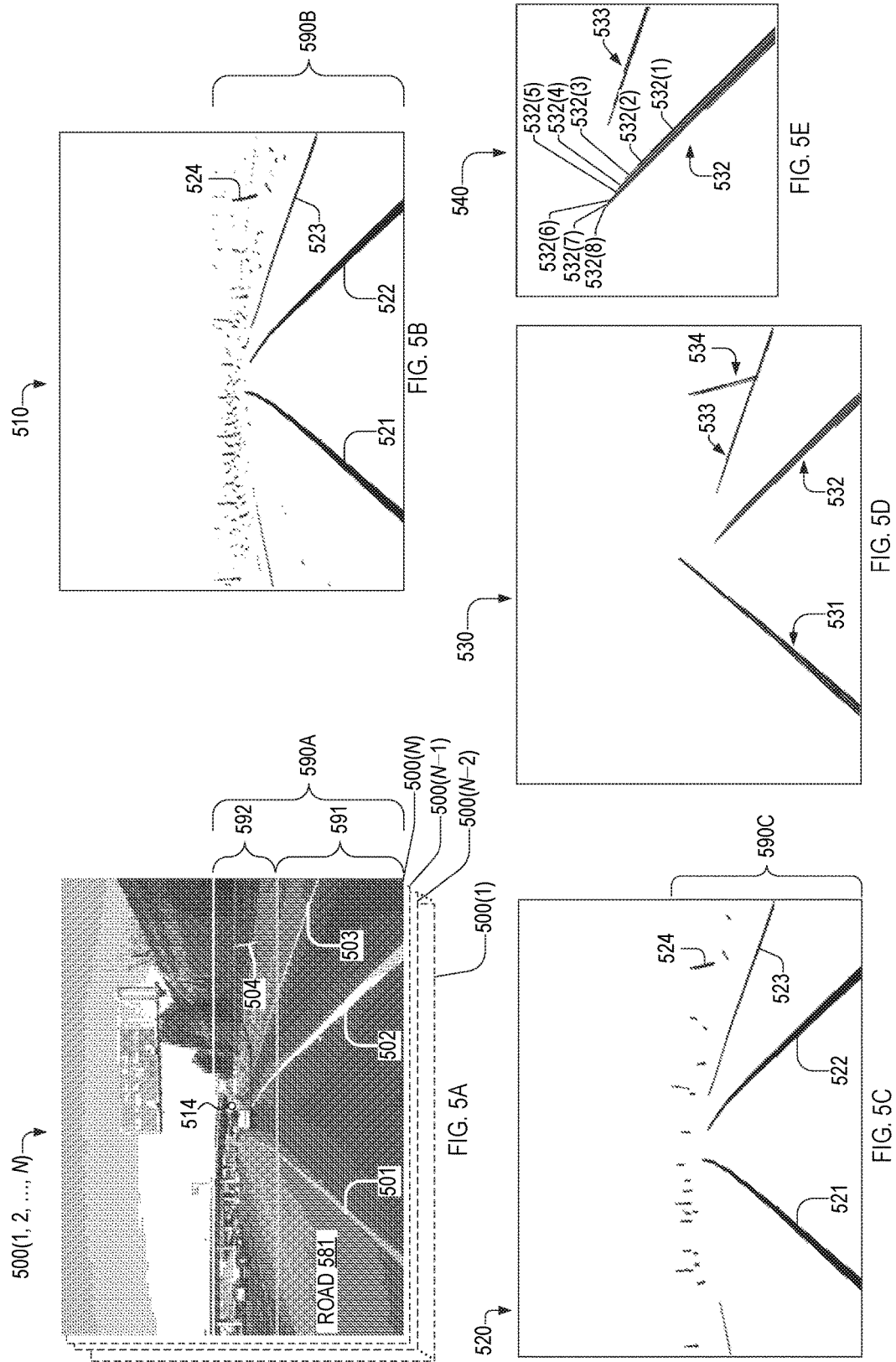

1400 ⟶

```
┌─────────────────────────────────────────────────────────────────────────────┐
│ CAMERA ALIGNMENT METHOD 1400 FOR DENOTING AN INITIAL VANISHING POINT ESTIMATE│
│ WITHIN AN INITIAL ROAD IMAGE CAPTURED FROM THE FRONT OF A VEHICLE TRAVELING  │
│ ALONG A ROAD HAVING LANE MARKERS                                            │
│                                                                  ╱─── 1410  │
│   ┌─────────────────────────────────────────────────────────────────────┐   │
│   │  CAPTURE AN INITIAL ROAD IMAGE WITH A CAMERA HAVING A FIELD OF VIEW │   │
│   │                      THAT INCLUDES THE ROAD                         │   │
│   └─────────────────────────────────────────────────────────────────────┘   │
│                                                                  ╱─── 1420  │
│   ┌─────────────────────────────────────────────────────────────────────┐   │
│   │ SUPERIMPOSE, ON A DISPLAY OF THE INITIAL ROAD IMAGE, A STATIC       │   │
│   │ VISUAL AID HAVING A VERTICAL COMPONENT AND A HORIZONTAL COMPONENT   │   │
│   └─────────────────────────────────────────────────────────────────────┘   │
│                                                                  ╱─── 1430  │
│   ┌─────────────────────────────────────────────────────────────────────┐   │
│   │ ADJUST A HORIZONTAL ANGULAR ORIENTATION OF THE CAMERA WITH RESPECT  │   │
│   │ TO THE ROAD SUCH THAT A HORIZONTAL LOCATION OF A VERTICAL COMPONENT │   │
│   │ OF THE VISUAL AID IS CENTERED BETWEEN THE LANE MARKERS DISPLAYED    │   │
│   │ THE DISPLAYED IMAGE                                                 │   │
│   └─────────────────────────────────────────────────────────────────────┘   │
│                                                                  ╱─── 1440  │
│   ┌─────────────────────────────────────────────────────────────────────┐   │
│   │ ADJUST A VERTICAL ANGULAR ORIENTATION OF THE CAMERA WITH RESPECT TO │   │
│   │ THE ROAD SUCH THAT A VERTICAL LOCATION OF THE HORIZONTAL COMPONENT  │   │
│   │ OF THE VISUAL AID IS NEAR A HORIZON OF THE IMAGE DISPLAYED IMAGE    │   │
│   └─────────────────────────────────────────────────────────────────────┘   │
└─────────────────────────────────────────────────────────────────────────────┘
```

FIG. 14

LANE DEPARTURE WARNING SYSTEM AND ASSOCIATED METHODS

BACKGROUND

An increasing number of new road vehicles are equipped with a lane departure warning system designed to monitor the position of the vehicle with respect to a lane boundary on a road. Central to a lane departure warning system is a robust lane marker detection algorithm module to provide meaningful and consistent lane information for driving safety and navigation purposes. Conventional lane-detection algorithms rely on feature detection schemes that include at least one of the following drawbacks: noise sensitivity, computational complexity, and complex hardware implementation.

SUMMARY OF THE INVENTION

The disclosed lane departure warning system and method overcomes problems of conventional lane-detection schemes. In an embodiment, a method for validating a candidate region as including an image of a lane marker on the road is disclosed. The candidate region is identified within a latest road image of a temporal sequence of road images captured from the front of a vehicle traveling along a road. When no previously-verified region and no previously-rejected region aligns with the candidate region, the method includes a step of determining a minimum distance between the candidate region and a previously-verified region of a previously-captured road image of the sequence. When the minimum distance exceeds a threshold distance, the method includes a step of storing the candidate region as a verified region. When the minimum distance is less than the threshold distance, the method includes a step of storing the candidate region as a rejected region.

In a second embodiment, a lane departure warning system for validating a candidate region as including an image of a lane marker on the road is disclosed. The candidate region is identified within a latest road image of a temporal sequence of road images captured from the front of a vehicle traveling along a road. The system includes a memory and an image processor. The memory stores non-transitory computer-readable instructions and adapted to store the road image. The image processor is adapted to execute the instructions to, when no previously-verified region and no previously-rejected region aligns with the candidate region: (i) determine a minimum distance between the candidate region and a previously-verified region of a previously-captured road image of the sequence, (ii) when the minimum distance exceeds a threshold distance, store the candidate region as a verified region, and (iii) when the minimum distance is less than the threshold distance, store the candidate region as a rejected region.

In a third embodiment, a method for determining a refined vanishing point estimate within a latest road image of a temporal sequence of road images is disclosed. Each road image is captured from the front of a vehicle traveling along a road. The method includes, for each road image of the temporal sequence, the following steps: (a) fitting a first line to a first region of the latest road image corresponding to a first lane marker on the road; (b) fitting a second line to a second region of the latest road image corresponding to a second lane marker on the road; (c) determining a lane-marker interval between the first region and the second region; (d) identifying a vanishing point candidate as an intersection of the first line and the second line; (e) determining a distance between the vanishing point candidate and a previously-determined vanishing point estimate; (f) storing the vanishing point candidate as a vanishing point estimate when (1) the lane-marker interval is within a predetermined interval based on a previously-determined lane-marker interval, and (2) the distance is less than a threshold distance; and (g) storing, in a memory, coordinates corresponding to the vanishing point estimate. The method also includes a step of determining a refined vanishing point estimate as a statistical average of the stored vanishing point estimates; and a step of setting the previously-determined vanishing point estimate equal to the refined vanishing point estimate.

In a fourth embodiment, a lane departure warning system for determining a refined vanishing point estimate within a road image is disclosed. The road image is the latest road image of a temporal sequence of road images captured from the front of a vehicle traveling along a road. The system includes a memory and an image processor. The memory stores non-transitory computer-readable instructions and is adapted to store the road image. The image processor is adapted to execute the instructions to, for each road image of the temporal sequence, execute steps (a) through (g) of the method disclosed in the aforementioned third embodiment. The image processor also adapted to execute the instructions to (i) determine a refined vanishing point estimate as a statistical average of the stored vanishing point estimates, and (ii) set the previously-determined vanishing point estimate equal to the refined vanishing point estimate.

BRIEF DESCRIPTION OF THE FIGURES

FIG. 5A shows a road image captured by the camera of FIG. 1. FIGS. 5B-5E show images processed from the road image of FIG. 5A by the lane departure warning system of FIG. 1.

FIG. 14 is a flow chart illustrating an exemplary method for determining an initial vanishing point estimate within a road image, in an embodiment.

DETAILED DESCRIPTION OF THE EMBODIMENTS

Figure 1:
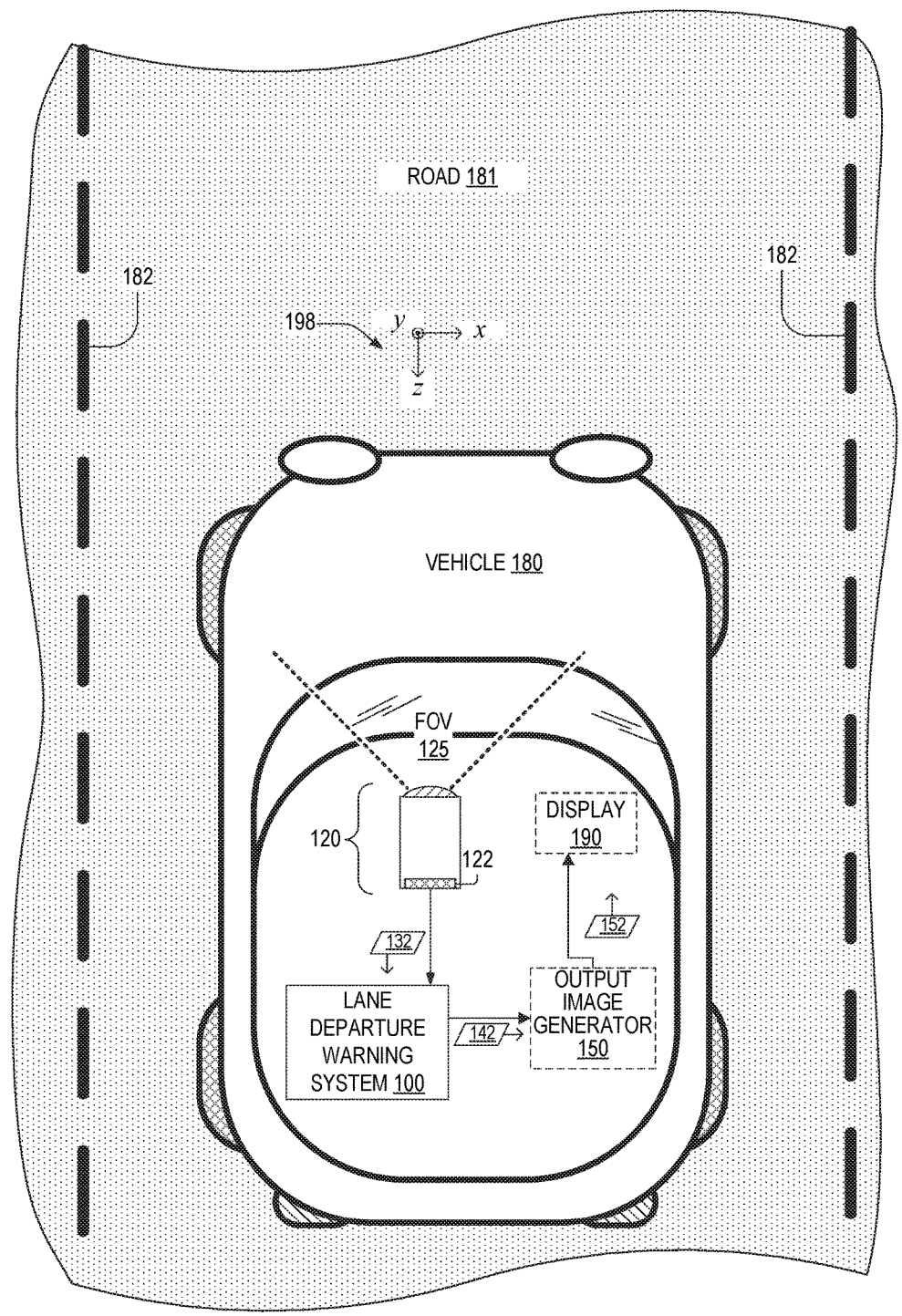
FIG. 1 is a plan view showing one exemplary lane departure warning system used within a vehicle equipped with a camera, in an embodiment.

FIG. 1 is a plan view showing one exemplary lane departure warning system 100 used within a vehicle 180. Vehicle 180 is on a road 181 that has lane markers 182, which are in a plane parallel to the x-z plane of a coordinate system 198. Herein, references to x, y, and z refer to coordinate system 198 unless otherwise specified. Lane departure warning system 100 includes an image processor 240. Vehicle 180 includes a camera 120 and optionally a display 190 communicatively coupled to lane departure warning system 100. Camera 120 includes an image sensor having a pixel array 122. In an embodiment, lane departure warning system 100 includes at least one of camera 120 and display 190. Herein, a lane marker is also referred to as a marker for sake of brevity.

Lane departure warning system 100 receives a road image 132 of a portion of road 181 within a field of view 125 of camera 120. Lane departure warning system 100 processes at least part of road image 132 to detect one or more lane markers 182 and generate a corresponding one or more detected lane markers 142. Detected lane markers 142 are for example one or more of an image demarcating lane markers 182 and an equation (or data set of coordinates) representable as a line or curve superimposable on road image 132.

In the example of FIG. 1, lane departure warning system 100 sends detected lane marker 142 to an output image generator 150 that generates an output image 152 for display on display 190. Output image generator 150 may generate output image 152 from road image 132 and detected lane marker 142. For example, output image 152 may be road image 132 with detected lane marker 142 superimposed thereon. In one embodiment, output image generator 150 is part of lane departure warning system 100.

Figure 2:
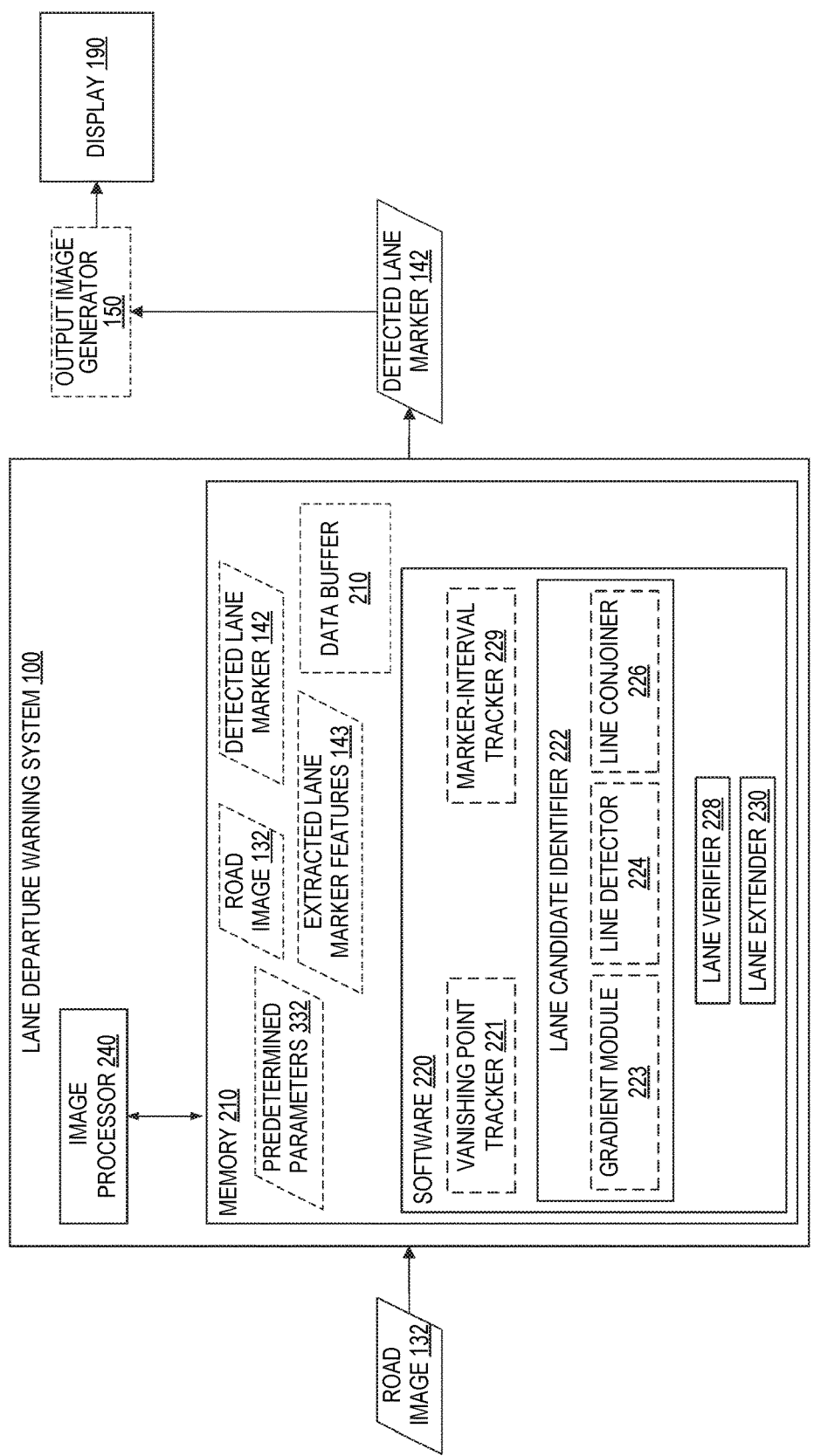
FIG. 2 shows the lane departure warning system of FIG. 1 in further exemplary detail, in an embodiment.

FIG. 2 shows lane departure warning system 100 in further exemplary detail. Lane departure warning system 100 includes an image processor 240 and memory 210 that stores software 220. Software 220 includes machine-readable instructions that, when executed by image processor 240, are capable of performing functions of lane departure warning system 100 as described herein. Software 220 includes the following software modules: a marker candidate identifier 222, a lane verifier 228, and a lane extender 230. Software 220 may also include a vanishing point tracker 221 and a marker-interval tracker 229. Memory 210 is also shown storing one or both of road image 132, received from camera 120, and detected lane marker 142, generated by software 220. Memory 210 may represent one or both of volatile memory (e.g., SRAM, DRAM, or any combination thereof) and nonvolatile memory (e.g., FLASH, ROM, magnetic media, optical media, or any combination thereof).

Marker candidate identifier 222 includes machine-readable instructions that, when executed by image processor 240, operate to process road image 132 to identify one or more marker candidates within a lane-existing region of the road image. Marker candidate identifier 222 may include a gradient module 223, a line detector 224, and a line conjoiner 226.

Lane verifier 228 includes machine-readable instructions that, when executed by image processor 240, operate to verify the marker candidate identified by marker candidate identifier 222 as verified detected markers when a distance between (a) a first line fit to a portion of the marker candidate and (b) a vanishing point estimate in the road image is less than a neighborhood distance. Lane extender 230 includes machine-readable instructions that, when executed by image processor 240, operates to extend the verified detected marker, verified by lane verifier 228, toward a horizon line of road image 132 to form detected lane marker 142 demarcating lane marker 182.

Figure 3A:
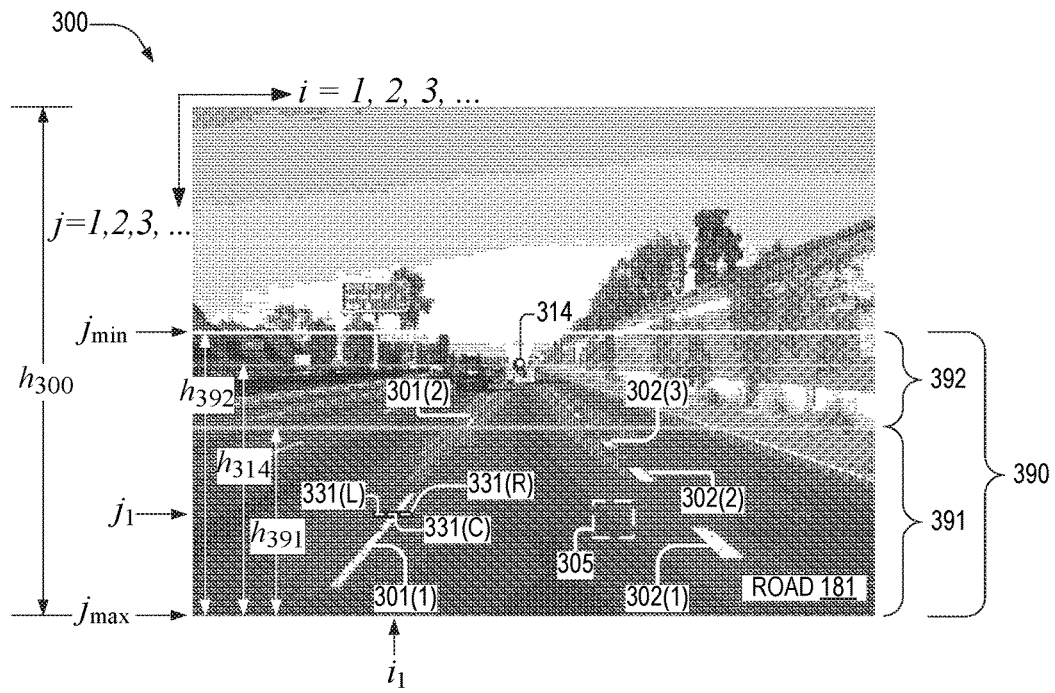
FIG. 3A shows an exemplary road image captured by the camera of FIG. 1.

FIG. 3A shows one exemplary road image 300 captured by camera 120 of FIG. 1. FIGS. 3B-9 show exemplary data processed from road image 300 by software 220 used to detect lane markings in road image 300. Road image 300 may represent road image 132 of FIG. 1. Road image 300 includes a lane-existing region 390 that is divided into a near subregion 391 and a far subregion 392. Lane-existing region 390 includes the bottom of road image 300. In other embodiments, lane-existing region 390 does not include the bottom of road image 300.

A vanishing point estimate 314 within road image 300 may correspond to one or more of (a) a vanishing point and (b) a location on the horizon line of road image 300. Vanishing point estimate 314 may correspond to a location on pixel array 122 (FIG. 1) determined when camera 120 is mounted on vehicle 180. The vertical location of vanishing point estimate 314 in road image 300 may correspond to an angle within the vertical angle of view of camera 120, where the vertical angle of view is in a plane orthogonal to road 181.

In an embodiment, vanishing point tracker 221 adjusts the location of vanishing point estimate 314 using a vanishing point tracking algorithm known in the art and one or more road images 132. Vanishing point estimate 314 may be adjusted toward the top of road image 300, for example, when vehicle 180 approaches an uphill section of road 181. Lane-existing region 390 extends above vanishing point estimate 314 such that when such an adjustment of vanishing point estimate 314 occurs, vanishing point estimate 314 remains within lane-existing region 390.

Road image 300 has a height $h_{300}$. With respect to the bottom of road image 300, near subregion 391 and far subregion 392 have heights $h_{391}$ and $h_{392}$ respectively. Similarly, vanishing point estimate 314 is at a height $h_{314}$ above the bottom of road image 300. Lane departure warning system 100 computes $h_{391}$ as $h_{391} = \alpha h_{314}$ and $h_{392}$ as $h_{392} = h_{314} + \beta h_{300}$, where, for road image 300, $\alpha = 3/4$ and $\beta = 1/16$.

In the following example, road image 300 is quantitatively represented as a plurality of pixel values p(i,j) where coordinate (i,j) denotes a pixel column index and row index respectively as shown in FIG. 3A. A pixel (i,j) refers to a location in road image 300 at coordinate (i,j) having pixel value p(i,j). The following pixel-based discussion of road image 300 provides a background for exemplary operation of marker candidate identifier 222, and specifically how gradient module 223 identifies ridge features within road image 300, of which at least some become marker candidates.

Row indices $j_{max}$ and $j_{min}$ correspond to pixel rows at the bottom and top of lane-existing region 390, respectively. A pixel value p(i,j) is for example a grayscale pixel value such that each pixel value is an integer between zero and $2^N-1$, inclusive, where N is a positive integer.

Figure 3B:
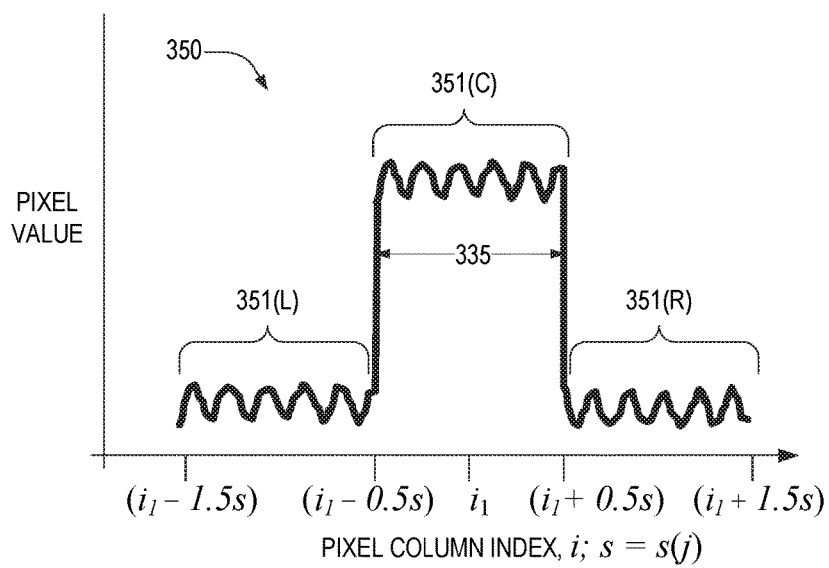
FIG. 3B shows a schematic pixel value cross-section of the road image of FIG. 3A along a horizontal patch.

Road image 300 shows lane markers 301(1, 2, . . . ) and 302(1, 2, . . . ), which correspond to lane markers 182 of road 181. For clarity of illustration, only lane markers 301(1-2) and 302(1-3) are labelled. FIG. 3B is a graph showing a schematic pixel value cross-section 350 of a portion of road image 300 at a pixel coordinate $(i_1, j_1)$ that is intersects lane marker 301(1). A horizontal patch 331 at pixel coordinate $(i_1, j_1)$ of road image 300 includes three sub-patches 331(L), 331(C), 331(R) corresponding to positions to the left of, on, and to the right of lane marker 301(1). Accordingly, pixel value cross-section 350 includes three sub-regions 351(L, C, R) corresponding to sub-patches 331(L, C, R) respectively.

Each sub-patch 331(L, C, R) (and corresponding sub-region 351(L, C, R) has a width 335 corresponding to a determined scale s(j) and a height of one pixel row, Scale s(j) is for example a number of pixel columns and may be an expected imaged width of lane marker 301 at row j in road image 300. Each lane marker 301 and 302 has an imaged lane-marker width (in road image 300) that depends on the lane marker's vertical position within road image 300 due to inherent perspective of road image 300. Thus, imaged lane markers appear widest at the bottom of lane-existing region 390 and narrowest at the top of lane-existing region 390. Accordingly, width 335 of horizontal patch 331(C) (and the value of scale $s(j_1)$) depends on the vertical position of horizontal patch 331 (represented by row index $j_1$) in road image 300.

Referring to lane departure warning system 100, gradient module 223 determines scale s(j). For example, gradient module 223 sets $s(j_{max})=20$, $s(j_{min})=1$, and determines the value of s(j) for $j_{min} \leq j \leq j_{max}$ by linearly interpolation between $s(j_{max})$ and $s(j_{min})$. Without departing from the scope hereof, sub-patches 331 may correspond to more than one pixel row, and sub-patches 331(L) and 331(R) may have widths that differ from the width of sub-patch 331(C).

Sub-regions 351(L, C, R) of intensity cross-section 350 (FIG. 3B) have average pixel values denoted as $\langle p_L(i_1, j_1)\rangle$, $\langle p_C(i_1, j_1)\rangle$, and $\langle p_R(i_1, j_1)\rangle$, respectively, which are, for example, computed as follows (evaluated at $(i,j)=(i_1, j_1)$), where s is an even integer: Average pixel value $\langle p_L(i,j)\rangle$ is the average of pixel values for pixels at row index j and in columns (i−1.5s(j)) through (i−0.5s(j)−1), inclusive. Average pixel value $\langle p_C(i,j)\rangle$ is the average of pixel values for pixels at row index j and in columns (i−0.5s(j)) through (i+0.5s(j)−1), inclusive. Average pixel value $\langle p_R(i,j)\rangle$ is the average of pixel values for pixels at row index j and in columns (i+0.5s(j)) through (i+1.5s(j)−1), inclusive.

Average pixel values $\langle p_L(i,j)\rangle$, $\langle p_C(i,j)\rangle$, and $\langle p_R(i,j)\rangle$ may be used to determine whether pixel location $(i_1, j_1)$ is a candidate ridge pixel. For example, pixel location $(i_1, j_1)$ is a candidate ridge pixel if two conditions (1) and (2) are satisfied, where ρ·Δ is a pre-defined weak threshold that guarantees the majority of lane pixels can be successfully classified as candidate ridge pixels. The quantity ρ is a weak factor, for example ρ=0.15.

The quantity Δ is a contrast value representative of a typical difference between (a) pixel values $p_L$ of pixels in a road image corresponding to a lane marker and (b) pixel values $p_{NL}$ of pixels in the road image corresponding to a portion of the road that is not a lane marker. For example, Δ= $\langle p_L\rangle - \langle p_{NL}\rangle$, which may result in Δ=130 when the upper limit of Δ is 255. In road image 300, examples of pixel values $p_L$ include pixel values within in lane markers 301 and 302, and examples of pixel values $p_{NL}$ include pixel values within an inter-marker region 305. In conditions (1) and (2), gradientLeft and gradientRight are horizontal image gradients computable by gradient module 223.

$$\text{gradientLeft: } \langle p_C(i,j)\rangle - \langle p_L(i,j)\rangle \geq \rho \cdot \Delta \quad (1)$$

$$\text{gradientRight: } \langle p_C(i,j)\rangle - \langle p_R(i,j)\rangle \geq \rho \cdot \Delta \quad (2)$$

In an embodiment, quantities ρ and Δ are predetermined empirically based on representative road images and stored in memory 210 of lane departure warning system 100 as predetermined parameters 332. Predetermined parameters 332 may include at least one of ρ and Δ, and product ρ·Δ. Predetermined parameters 332 may also include several values of Δ representative of roads in different conditions that affect visibility such as rain, fog, ice, snow, glare, ambient light level, and lane-marker color.

Figure 4A:
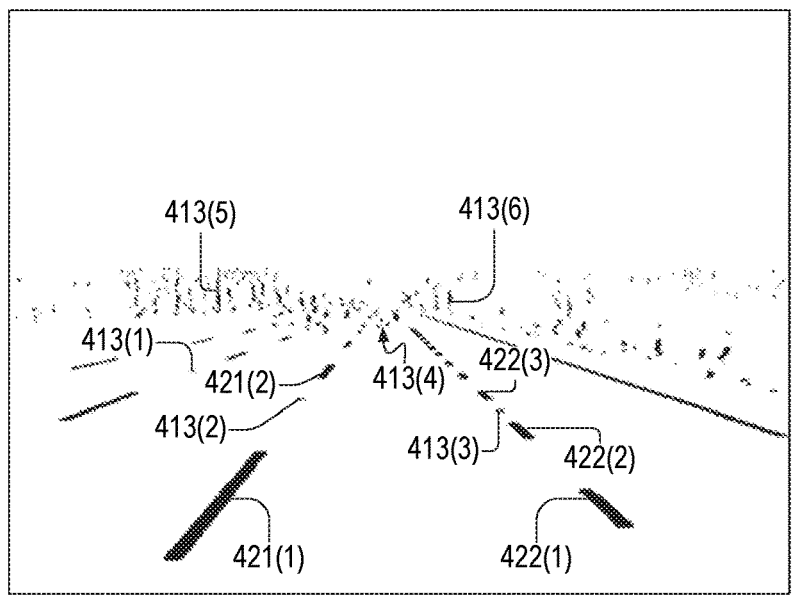
FIGS. 4A and 4B show exemplary ridge-feature images processed from the road image of FIG. 3A by the lane departure warning system of FIG. 1.
Figure 4B:
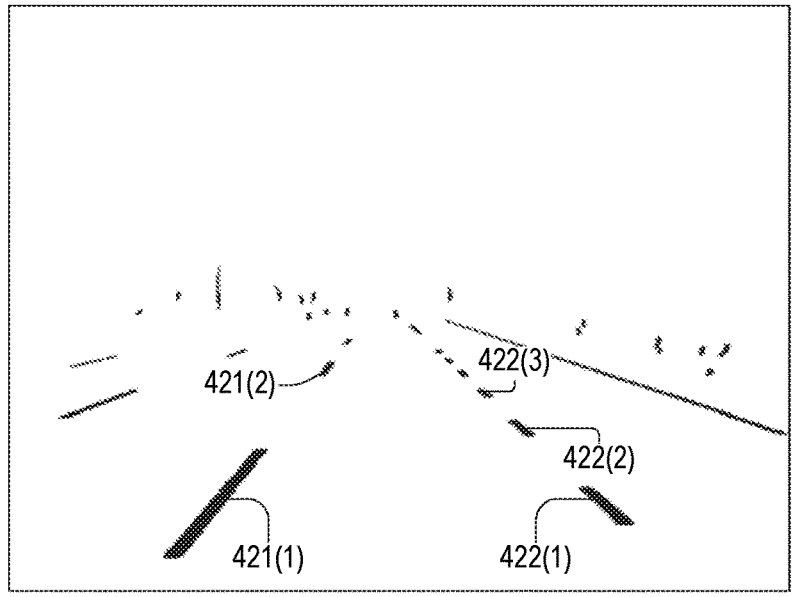

Gradient module 223 evaluates conditions (1) and (2) at a plurality of pixel coordinates (i,j) within road image 300, which results in a ridge-feature image 400 shown in FIG. 4A. The plurality of pixel coordinates correspond for example to coordinates within lane-existing region 390. A pixel value p(i,j) in ridge-feature image 400 is one of two values (for example one and zero) depending on whether a horizontal patch associated with pixel coordinate (i,j) of road image 300 satisfies conditions (1) and (2), where threshold ρ equals 0.15. A ridge feature is a plurality of contiguous candidate ridge pixels that may correspond to a lane marker in road image 300. Ridge-feature image 400 includes ridge features 421(1,2) and 422(1-3) that correspond to lane markers 301(1,2) and 302(1-3) of road image 300.

Ridge-feature image 400 may also include false ridge-features, such as false ridge-features 413(1-6), which do not correspond to a lane marker of road image 300. Incidence of false ridge-features increases as the value of ρ·Δ decreases. In an embodiment, marker candidate identifier 222 refines ridge-feature image 400 to eliminate false ridge-features, such as 413(1-4), to yield a refined-ridge-feature image 450 shown in FIG. 4B. Refined-ridge-feature image 450 results from a continuity threshold operation, executed by marker candidate identifier 222 for example, to ridge-feature image 400. The continuity threshold operation removes candidate ridge pixels from ridge-feature image 400 that are not part of a contiguous group of M candidate ridge pixels where M≥k, where k is an integer continuity threshold value. For example, k=8 in refined-ridge-feature image 450. Two contiguous pixels may be adjacent in one of a horizontal, vertical, or diagonal direction with respect to pixel rows and columns.

FIGS. 5A-5C show a road image 500(N), a ridge-feature image 510 formed from road image 500(N), a refined-ridge-feature image 520 refined from ridge-feature image 510. Road image 500(N) is the latest road image (most recently captured) of a temporal sequence of road images 500(1, 2, . . . N) captured by camera 120 as vehicle 180 proceeds along road 181 or 581. Image indices (1, 2, . . . N) correspond to respective capture times $t_1, t_2, \ldots, t_N$ of respective images 500(1, 2, . . . N), where $t_1 < t_2 < t_N$.

Road image 500(N) is an example of road image 132, and includes a section of a road 581 that includes lane markers 501-504 and a lane-existing region 590A, which includes a near subregion 591 and a far subregion 592, which are similar to subregions 391 and 392, respectively, of road image 300. Road image 500(N) includes a vanishing point estimate 514, which may correspond to one or more of (a) a vanishing point and (b) a vertical location on the horizon line of road image 500(N). Road 581 is an example of road 181.

Refined-ridge-feature image 520 results from a continuity threshold operation, executed by marker candidate identifier 222 for example, to ridge-feature image 510. Ridge-feature image 510 and refined-ridge-feature image 520 include ridge features 521-524 that correspond to lane markers 501-504 respectively. Referring to lane departure warning system 100, ridge features 521-524 are exemplary output of gradient module 223 as executed by image processor 240 using a process similar to the process used to identify ridge features 421 and 422.

FIG. 5D is a fitted ridge-feature image 530 derived from refined ridge-feature image 520. Fitted ridge-feature image 530 includes line groups 531-534 that each at least partially overlaps ridge features 521-524, respectively. Referring to lane departure warning system 100, line detector 224 identifies line groups 531-534. Each line group 531-534 includes a plurality of lines $531(1\text{-}m_1)$, $532(1\text{-}m_2)$, $533(1\text{-}m_3)$, and $534(1\text{-}m_4)$, respectively. For example, FIG. 5E is a magnified view 540 of a portion of line group 532 the shows lines 532(1-8).

Refined-ridge-feature image 520 includes a lane-existing region 590C. In an embodiment, fitted ridge-feature image 530 results from line detector 224 applying a Hough transform to lane-existing region 590C of refined-ridge-feature image 520. Alternatively, fitted ridge-feature image 530 may result from line detector 224 applying a Hough transform to lane-existing region 590B of ridge-feature image 510. A feature extraction technique other than a Hough transform may be used to generate fitted ridge-feature image 530 from either ridge-feature images 510 and 520.

Each lane-existing region 590(0, 1, 2) refers to a lane-existing region of images 500(N), 510, and 520, respectively. Since images 510 and 520 are processed versions of road image 500(N), lane-existing regions 590(1, 2) are also considered herein as corresponding to lane-existing region 590A, where the parenthetical index designates an associated image.

Figure 6:
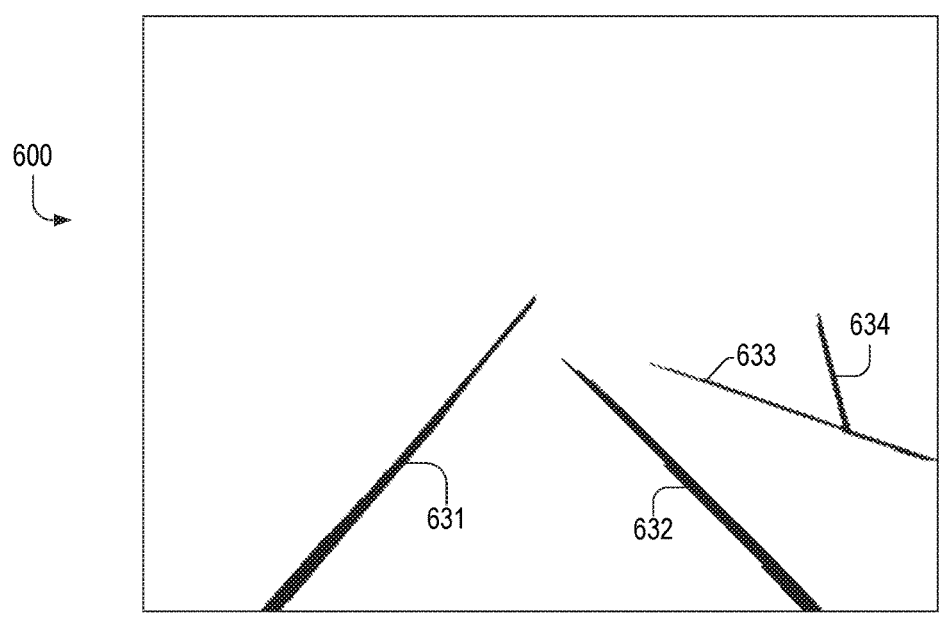
FIG. 6 shows a marker-candidate image generated from the image of FIG. 5D by the lane departure warning system of FIG. 1.

Line groups 531-534 may be each conjoined, by line conjoiner 226 for example, into marker candidates 631-634 respectively, as shown in a marker-candidate image 600, FIG. 6. In an embodiment, line conjoiner 226 applies a morphological operator may to line groups 531-534 to generate marker candidates 631-634, respectively.

Figure 7:
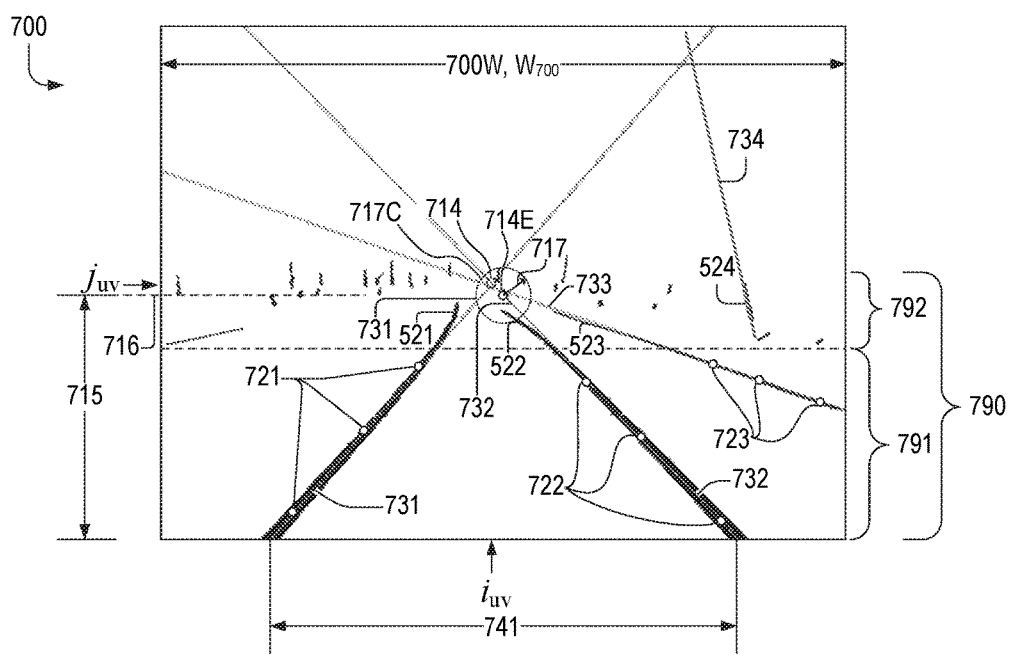
FIG. 7 is a true-marker-candidate image formed from the image of FIG. 5C and the marker-candidate image of FIG. 6.

FIG. 7 is a true-marker-candidate image 700 formed from refined-ridge-feature image 520 and marker-candidate image 600. True-marker-candidate image 700 is for example generated by lane verifier 228 of lane departure warning system 100. True-marker-candidate image 700 includes a vanishing point estimate 714E located at a height 715 from the bottom of true-marker-candidate image 700 indicated by horizon line 716 superimposed thereon. Vanishing point estimate 714E, which may correspond to one or more of (a) a vanishing point and (b) a location on the horizon line of road image 500(N). Vanishing point estimate 714E, for example, corresponds to vanishing point estimate 514 of road image 500(N).

True-marker-candidate image 700 includes ridge features 521-524 and corresponding linear ridge extensions 731-734 respectively. Linear ridge extensions 731-733 each intersect horizon line 716 less than a neighborhood distance 717 from vanishing point estimate 714E, which qualifies ridge features 521-523 as verified detected markers. Neighborhood distance 717 is a distance within true-marker-candidate image 700. Linear ridge extensions 731 and 732 intersect at location 714. Location 714 corresponds to a pixel location ($i_{uv}$, $j_{uv}$) within true-marker candidate image 700, which in turn corresponds to a pixel location within road image 500(N).

Adjacent linear ridge extensions 731 and 732 are separated by a lane-marker interval 741, herein also referred to as $W_{741}$, at the bottom of true-marker-candidate image 700. True-marker-candidate image 700 has a width 700W, herein also referred to as $W_{700}$. Magnitudes of lane-marker interval 741 and width 700W are for example expressible as a number of pixels and are examples of extracted lane marker features 143 stored in memory 210, FIG. 2. Memory 210 optionally includes a data buffer 212, in which extracted lane marker features 143 may be stored.

As true-marker-candidate image 700 is derived from road image 500(N), it is a latest of series of true-marker-candidate images 700(1, 2, . . . N), corresponding to temporal sequence of road images 500(1, 2, . . . , N). Accordingly, true-marker-candidate image 700 is also denoted by reference numeral 700(N). Similarly, locations 714 may be considered a latest location 714(N) of a series of locations 714(1, 2, . . . , N) and lane-marker interval 741 may be considered a latest location 741U(N) of a series of lane-marker intervals 741(1, 2, . . . , N)

Referring to lane departure warning system 100, lane verifier 228 generates linear ridge extensions 731-734 and verifies ridge features 521-523 as verified detected markers. Lane verifier 228 may also reject ridge feature 524 from being a verified detected marker.

Ridge feature 524 does not qualify as a verified detected marker because its line ridge extension 734 intersects horizon line 716 at a distance from vanishing point estimate 714E that exceeds neighborhood distance 717. Neighborhood distance 717 need not be a distance from vanishing point estimate 714E on horizon line 716. For example, neighborhood distance 717 may be a maximum allowable value of a minimum distance (that is, a perpendicular distance) between a linear ridge extension and vanishing point estimate 714E. Alternatively, neighborhood distance 717 is a radius of a circle 717C centered on vanishing point estimate 714E.

True-marker-candidate image 700 includes a lane-existing region 790, which includes a near subregion 791 and a far subregion 792. Regions 790, 791, and 792 correspond to regions 590A, 591, and 592, respectively, of road image 500(N). Linear ridge extensions 731-734 are formed by fitting a line to a plurality of near control points, within near subregion 791, in each ridge feature 521-524 respectively. Ridge features 521-523 have near control points 721-723, respectively. Linear ridge extensions 731-733 are lines fit, for example by lane verifier 228, to near control points 721-723, respectively. Ridge extensions 731-733 may be non-linear fit to control points 721-723, respectively, without departing from the scope hereof.

Near control points 721-723 correspond to locations in at least one of ridge-feature image 510 and refined-ridgefeature image 520. In an embodiment, lane verifier 228 determines control points 721-723 by searching for control points within ridge-feature image 510 or 520 using a point in marker candidates 631-633 respectively as a starting point for searching for control points. In this sense, marker candidates 631-633 function as seed lanes.

Figure 8:
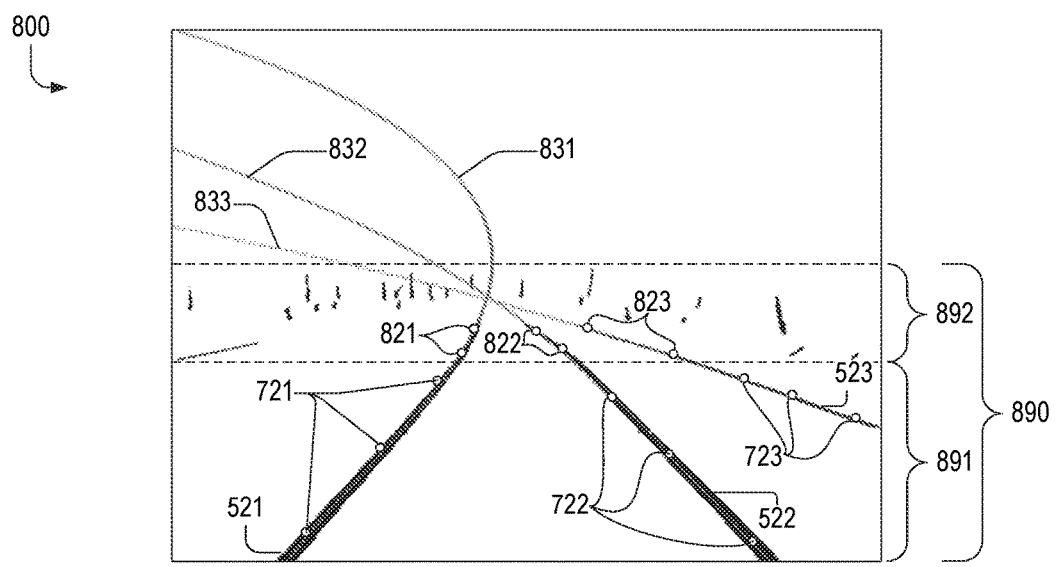
FIG. 8 is an extended-lane image formed by the lane departure warning system of FIG. 1, which extends verified detected markers of the true-marker-candidate image FIG. 7.

FIG. 8 is an extended-lane image 800 formed by extending verified detected markers, ridge features 521-524, determined by the linear ridge extensions 731-733 of true-marker-candidate image 700. Extended-lane image 800 includes a lane-existing region 890, which includes a near subregion 891 and a far subregion 892. Regions 890-892 correspond to regions 790-792, respectively, of marker-candidate image 700. Referring to lane departure warning system 100, lane extender 230 extends ridge features 521-523 into far subregion 892 of extended-lane image 800.

Extended-lane image 800 includes fitted curves 831-833, which correspond to ridge features 521-523, respectively. In an embodiment, lane extender 230 generates each fitted curve 831-833 by fitting a non-linear curve to near control points in near subregion 891 and a far control point in far subregion 892. Ridge features 521-523 have far control points 821-823, respectively. Fitted curve 831 is a polynomial curve fit to near control points 721 and far control points 821. Fitted curve 832 is a polynomial curve fit to near control points 722 and far control points 822. Fitted curve 833 is a polynomial curve fit to near control points 723 and far control points 823. Referring to lane departure warning system 100, lane extender 230 identifies far control points 821-823 corresponding to ridge features 521-523 respectively.

In an embodiment, lane extender 230 generates one or more fitted curves 831-833 by employing at least one of a linear fit, a polynomial curve fit, and a non-linear curve fit of near control points and far control points of respective ridge features 521-523. The location of a control point, such as near control points 721-723 and far control points 821-823, may correspond to a pixel coordinate a road image or to location in the road image between adjacent pixels, such as an interpolated position between a plurality of pixel coordinates.

Extended-lane image 800 is processed from road image 500(N) by lane departure warning system 100 of vehicle 180. Control points 721-723 and 821-823 maybe designated as 721(1)-723(1) and 821(1)-823(1). In a subsequent road image, designated as 500(2) for example, at least portion of far control points 821(1)-823(1) move into near subregion 891 and may be reassigned as near control points 721(2)-723(2), and be fit by a line. Alternatively, near control points 721(2)-723(2) of road image 500(2) may be determined independently of far control points 821(1)-823(1) of previous image 500(1).

Figure 9:
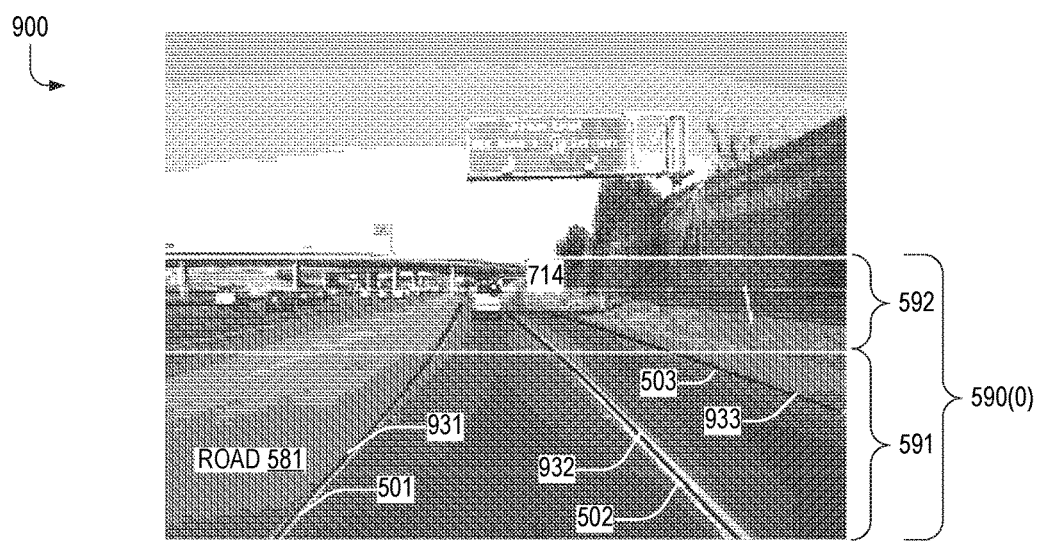
FIG. 9 shows detected lane markers superimposed, by the lane departure warning system of FIG. 1, on lane markers of the road image of FIG. 5A.

FIG. 9 is a road image 900 showing detected lane markers 931-933 (black) superimposed on lane markers 501-503 (white), respectively, within lane-existing region 590A of a road 581. Detected lane markers 931-933 are portions of fitted curves 831-833 respectively beneath vanishing point estimate 714E. Referring to lane departure warning system 100, lane extender 230 generates detected lane markers 931-933, which are each examples of one detected lane marker 142. Road image 900 may be viewed on display 190.

Figure 10:
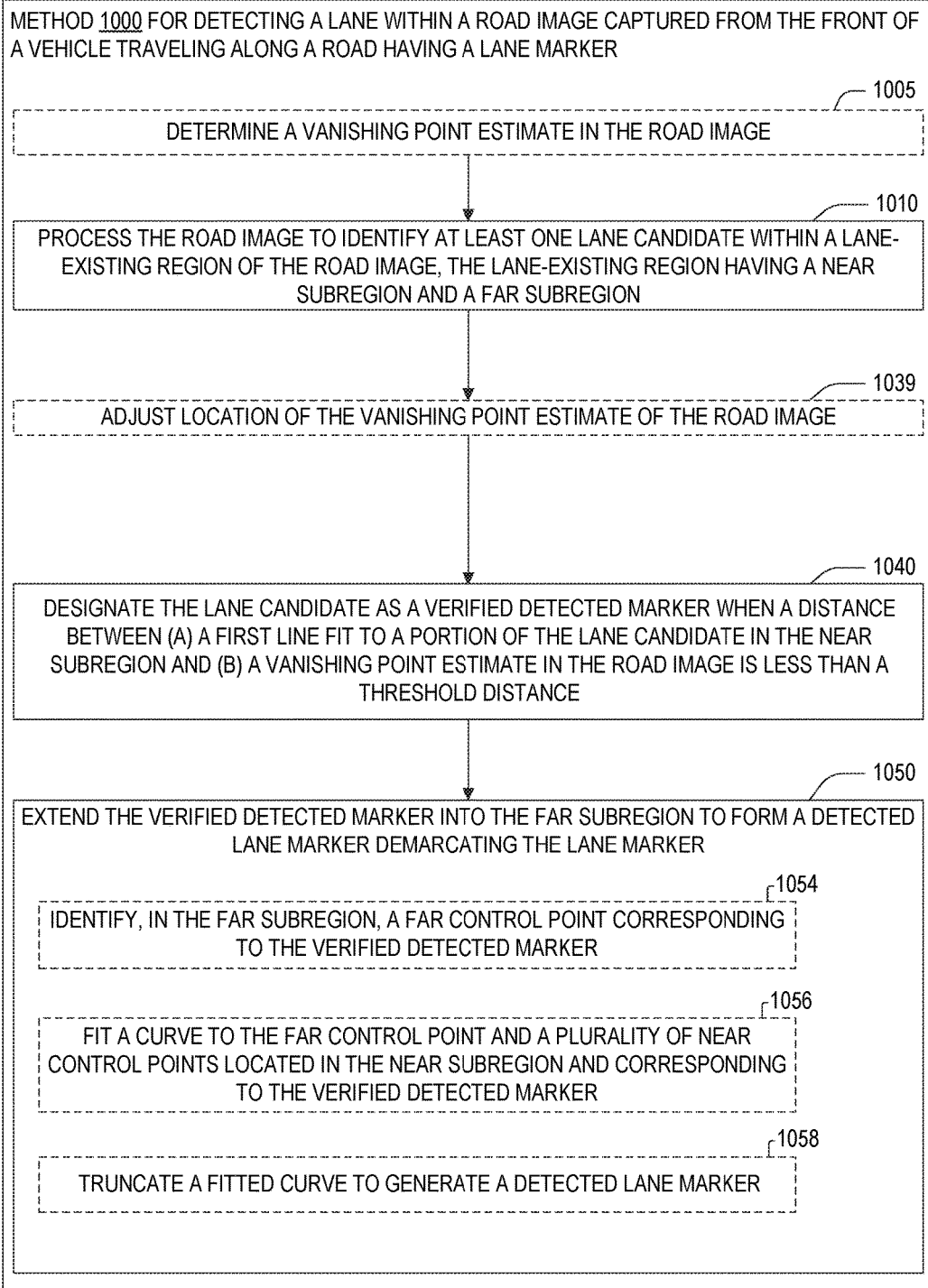
FIG. 10 is a flowchart illustrating one exemplary method for detecting a lane marker within a road image, in an embodiment.

FIG. 10 is a flowchart illustrating an exemplary method 1000 for detecting a lane marker within a road image captured from the front of a vehicle traveling along a road having a lane marker. FIGS. 2-9 show road images and processed road images corresponding to steps of method 1000. FIGS. 2-10 are best viewed together in the following description. Method 1000 is, for example, implemented within one or more aspects of lane departure warning system 100. For example, method 1000 is implemented by image processor 240 executing computer-readable instructions of software 220.

Method 1000 may include optional step 1005. If included, in step 1005, method 1000 determines a vanishing point estimate in the road image. In an example of step 1005, a driver or passenger of vehicle 180 adjusts an angular orientation of camera 120, with respect to at least one of the x-z and y-z planes, to determine vanishing point estimate 514 of road image 500.

In step 1010, method 1000 processes the road image to identify a marker candidate within a lane-existing region of the road image, the lane-existing region having a near subregion and a far subregion including, respectively, imaged road regions nearer to the vehicle, and imaged road regions farther from the vehicle. In a first example of step 1010, marker candidate identifier 222 identifies marker candidate 631 of marker-candidate image 600. In a second example of step 1010, marker candidate identifier 222 identifies marker candidates 631-634 of marker-candidate image 600. Applicant notes that method 1000, and step 1010 in particular, requires neither pre-processing steps such as denoising and feature enhancement, or an inverse perspective transform, to identify marker candidates.

In step 1040, method 1000 designates the marker candidate as a verified detected marker when a distance between (a) a first line fit to a portion of the marker candidate in the near subregion and (b) a vanishing point estimate in the road image is less than a neighborhood distance. In an example of step 1040, lane verifier 228 designates ridge features 521-523 as verified detected markers, as shown in FIG. 7. The vanishing point estimate is, for example, the vanishing point estimate determined in step 1005.

Method 1000 may include optional step 1039. If included, in step 1039, method 1000 adjusts the location of a vanishing point estimate in the road image. In an example of step 1039, vanishing point tracker 221 adjusts the location of vanishing point estimate 314 within road image 300.

In step 1050, method 1000 extends the verified detected marker into the far subregion to form a detected lane marker demarcating the lane marker. In an example of step 1050, lane extender 230 extends ridge features 521-523 into far subregion 892 of extended-lane image 800.

Step 1050 optionally includes steps 1054, 1056, and 1058. If included, in step 1054, method 1000 identifies, in the far subregion, a far control point corresponding to the verified detected marker. In an example of step 1054, lane extender 230 identifies far control points 821-823 corresponding to ridge features 521-523 respectively, as shown in FIG. 8.

If included, in step 1056, method 1000 fits a curve to the far control point and a plurality of near control points located in the near subregion and corresponding to the verified detected marker. In an example of step 1056, lane extender 230 fits (i) fitted curve 831 to near control points 721 and far control points 821, (ii) fitted curve 832 to near control points 722 and far control points 822, and (iii) fitted curve 833 to near control points 723 and far control points 823.

If included, in step 1058, method 1000 truncates a fitted curve to generate a detected lane marker. In an example of step 1058, lane extender 230 truncates fitted curves 831-833 to generate detected lane markers 931-933 respectively.

Figure 11:
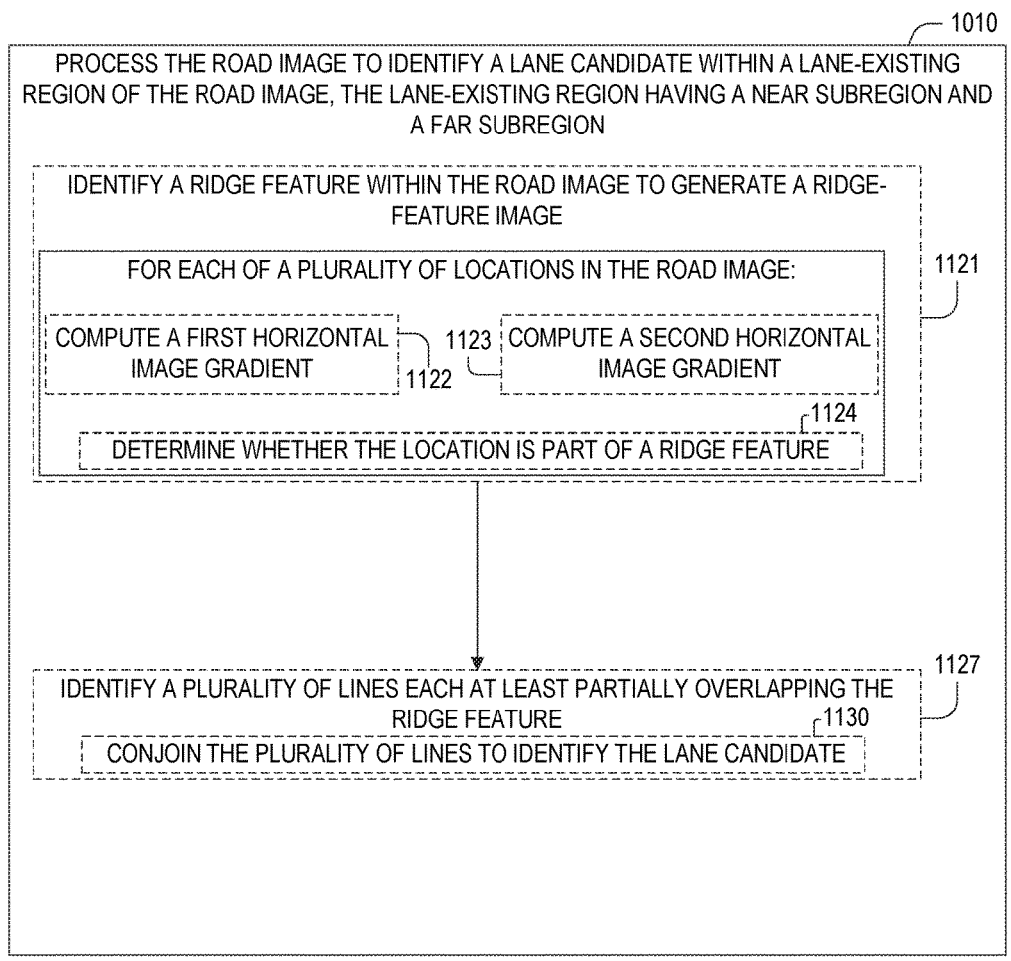
FIG. 11 is a flowchart illustrating further exemplary detail of the road-image-processing step of FIG. 10, in an embodiment

Step 1010 may include steps 1121 and 1127, shown in FIG. 11. If included, in step 1121, method 1000 identifies a ridge feature within the road image to generate a ridge-feature image. In an example of step 1121, marker candidate identifier 222 identifies ridge features 421 and 422 within road image 300 to generate ridge-feature image 400 shown in FIG. 4.

Step 1121 may include steps 1022-1024. If included, in step 1122, method 1000 computes, for each of a plurality of locations of the road image, a first horizontal image gradient partially based on a first image intensity representative of a first image region entirely to the left of the location. If included, in step 1123, method 1000 computes, for each of a plurality of locations of the road image, a second horizontal image gradient partially based on a second image intensity representative of a second image region entirely to the right of the location. For a given location in the road image, the first and second horizontal image gradient is also based on a central image intensity representative of a central image region that includes the location.

In an example of steps 1122 and 1123, gradient module 223 computes gradient Left and gradientRight of conditions (1) and (2) associated with sub-regions 351(L, C, R) (pixel location $(i_1, j_1)$) of horizontal patch 331(L, C, R) of road image 300, FIG. 3A.

If included, in step 1124, method 1000 determines whether the location is part of a ridge feature based on the first horizontal image gradient and the second horizontal image gradient. In an example of step 1124, gradient module 223 determines if pixel location $(i_1, j_1)$ in road image 300 is a candidate ridge pixel according to whether conditions (1) and (2) are satisfied.

In step 1127, method 1000 identifies a plurality of lines each at least partially overlapping the ridge feature. In an example of step 1127, line detector 224 identifies line groups 531-534 of fitted ridge-feature image 530 (FIG. 5D), which at least partially overlap ridge features 521-524 respectively.

Step 1127 optionally includes step 1130. In step 1130, method 1000 conjoins the plurality of lines to identify a marker candidate. In an example of step 1130, line conjoiner 226 conjoins each line group 531-534 resulting in marker candidates 631-634 respectively, as shown in FIG. 6. Applicant notes that method 1000, and step 1127 in particular, does not require time-consuming computations such as data traversal, appending, and deletion.

Figure 12:
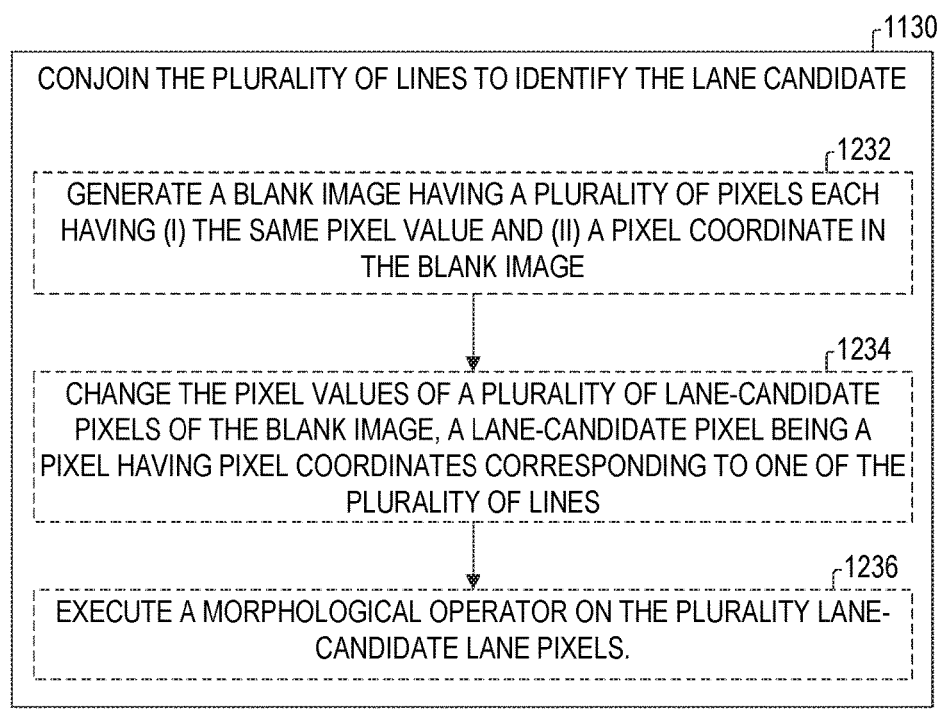
FIG. 12 is a flowchart illustrating further exemplary detail of the conjoining step of FIG. 11, in an embodiment.

In an embodiment of method 1000, step 1130 includes steps 1234 and 1236, as shown in FIG. 12. Step 1234 pertains to a blank image having a plurality of pixels each having (i) the same pixel value and (ii) a pixel coordinate in the blank image. The blank image is for example visually equivalent to marker-candidate image 600 with marker candidates 631-634 removed. Quantitatively, a blank image may be a two-dimensional array of numbers stored as an array data type within memory 210 of lane departure warning system 100, where each array element has the same value, e.g. zero. The two-dimensional array may be displayed as an image, such that each array element (identified by two indices for example) is a pixel, and the array element's value is a pixel value.

If included, in step 1234, method 1000 changes the pixel values of a plurality of marker-candidate pixels of the blank image, a marker-candidate pixel being a pixel with pixel coordinates corresponding to one of the plurality of lines identified in step 1127 (FIG. 11). In an example of step 1234 line conjoiner 226 produces an image that visually resembles image 530. Step 1130 may also include step 1232, in which method 1000 generates the blank image.

If included, in step 1236, method 1000 executes a morphological operator on the plurality marker-candidate pixels. In an example of step 1236, line conjoiner 226 executes a morphological operator that conjoins the plurality marker-candidate pixels into marker candidates 631-634. The morphological operator is for example a closing operator.

Figure 13A:
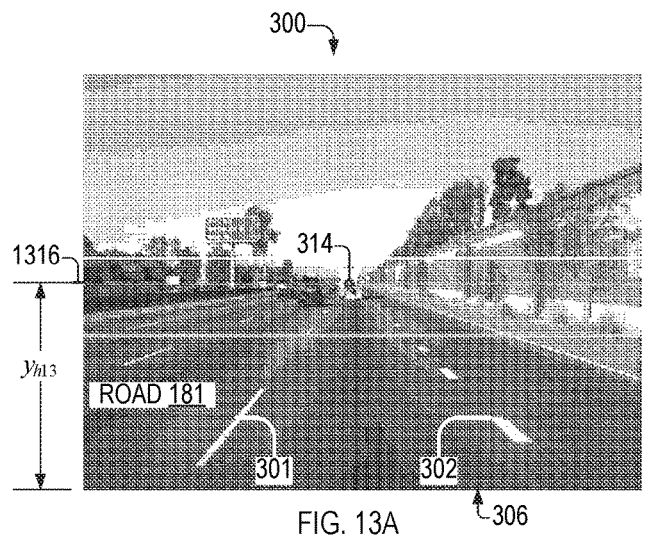
FIG. 13A depicts the road image of FIG. 3A

FIG. 13A shows road image 300 with a horizon 1316 located a distance $y_{h13}$ from the bottom edge 306 thereof. Horizon 1316 intersects vanishing point 314 of road image 300. Reference numerals 301, 302, and 181 are annotations to road image 300, and not part of road image 300.

Figure 13B:
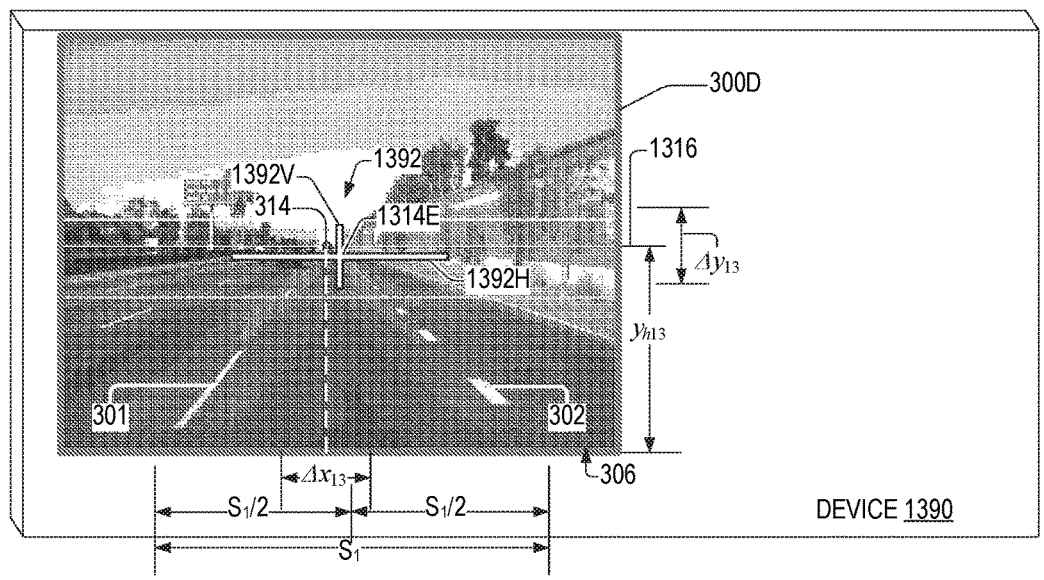
FIG. 13B depicts a device displaying the road image of FIG. 13A, in an embodiment.

FIG. 13B shows road image 300 displayed by a device 1390 as a displayed image 500D. Device 1390 is an example of display 190 (FIG. 1), may include camera 120, and is for example mounted inside vehicle 180. Device 1390 superimposes a visual aid 1392 on displayed image 500D. Visual aid 1392 has a vertical component 1392V and a horizontal component 1392H, which intersect at an initial vanishing point estimate 1314E. Initial vanishing point estimate 1314E is an example of vanishing point estimate 714E of true-marker-candidate image 700. In this example, vanishing point estimate 1314E is displaced from the actual vanishing point of road image 300, i.e., vanishing point 314.

FIG. 14 is a flow chart illustrating an exemplary method 1400 for determining an initial vanishing point estimate within an initial road image captured from the front of a vehicle traveling along a road having lane markers. Method 1400 is, for example, implemented by software 220 of lane departure warning system 100 as part of method 1000.

Method 1000 includes step 1005. In an example of step 1005, step 1005 performs steps of method 1400, in which the vanishing point estimate of step 1005 is an initial vanishing point of the method 1400. Method 1000 includes optional step 1039, in which the vanishing point estimate may correspond to the initial vanishing point determined in method 1400. FIGS. 13A, 13B, and 14 are best viewed together in the following description.

Method 1400 includes step 1410. In step 1410, method 1400 captures an initial road image with a camera having a field of view that includes the road. In an example of step 1410, camera 120 (FIG. 1) a captures road image 300.

In step 1420, method 1400 superimposes, on a display of the initial road image, a static visual aid having a vertical component and a horizontal component. In an example of step 1420, display 1390 superimposes visual aid 1392 on displayed image 300D at or near the center of displayed image 300D.

In step 1430, method 1400 adjusts a horizontal angular orientation of the camera with respect to the road such that a horizontal location of a vertical component of the visual aid is at a centered between the lane markers displayed the displayed image. In an example of step 1430, the orientation of camera 120 with respect to the x-z plane is adjusted such that vertical component 1392V is centered between lane markers 301 and 302 as displayed in displayed image 300D. In displayed image 300D, lane markers 301 and 302 (or linear extensions thereof) have a maximum horizontal separation $S_1$ at bottom edge 306. In an example of step 1430, the horizontal location of vertical component 1392V is within a tolerance $\Delta x_{13}$, relative to the horizontal position of vanishing point 314, where $\Delta x_{13}/S_1$ is 0.10.

In step 1440, method 1400 adjusts a vertical angular orientation of the camera with respect to the road such that a vertical location of a horizontal component of the visual aid is near a horizon of the displayed image. In an example of step 1430, the orientation of camera 120 with respect to the y-z plane is adjusted such that horizontal component 1392H is near horizon 1316 of displayed image 300D. The horizontal location determined in step 1430 and the vertical location determined in step 1440 correspond to the initial vanishing point estimate. In an example of step 1440, the vertical location of horizontal component 1392H is within a tolerance $\Delta y_{13}$ of horizon 1316, where $\Delta y_{13}/y_{h13}$ is 0.10.

Figure 15:
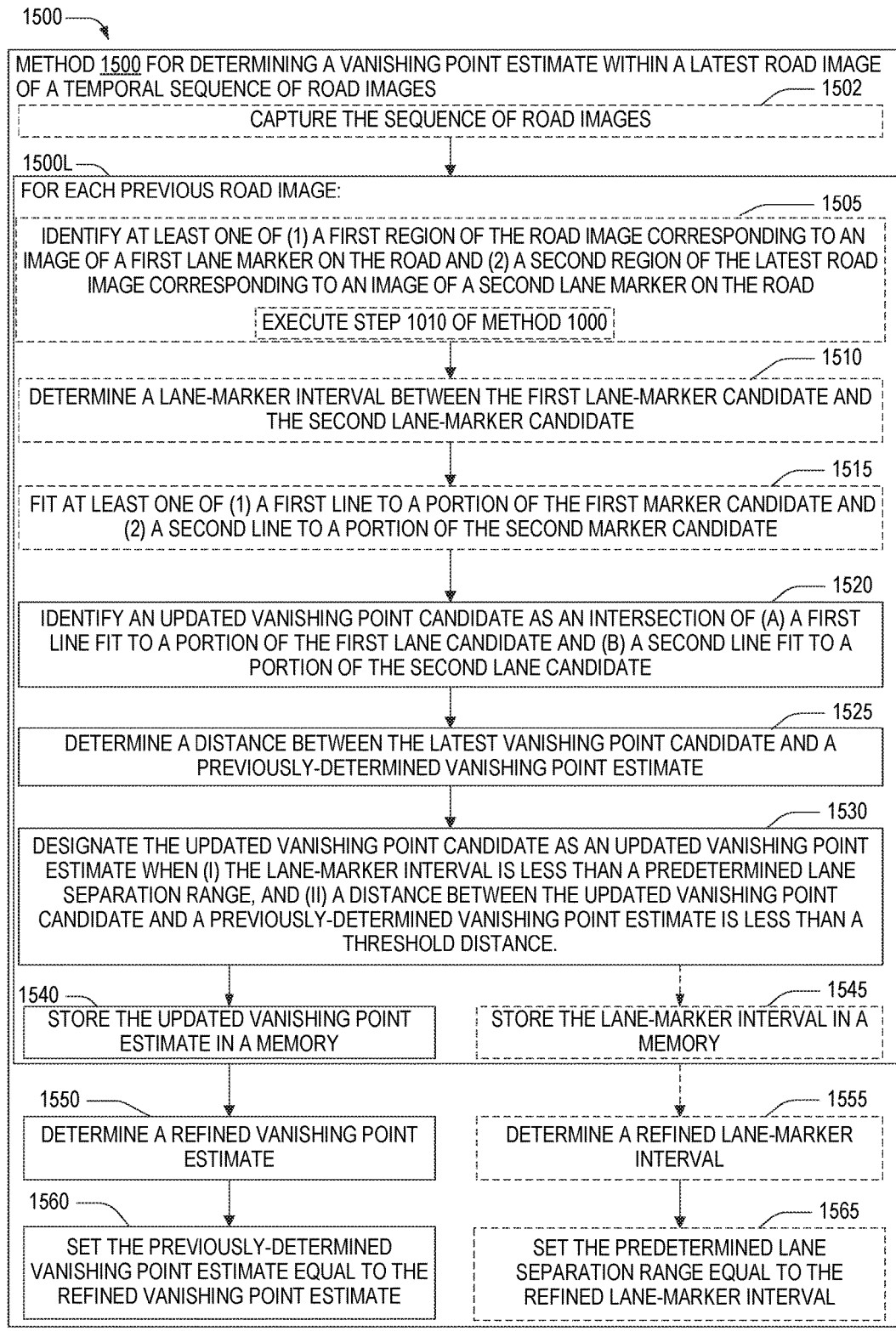
FIG. 15 is a flow chart illustrating an exemplary method for determining a refined vanishing point estimate within a road image, in an embodiment.

FIG. 15 is a flow chart illustrating an exemplary method 1500 for determining a refined vanishing point estimate within a latest road image of a temporal sequence of road images captured from the front of a vehicle traveling along a road. Method 1500 is, for example, implemented within one or more aspects of lane departure warning system 100. For example, method 1500 is implemented by image processor 240 executing computer-readable instructions of software 220. Method 1500 may be implemented as at least part of step 1039 of method 1000.

Step 1502 is optional. In step 1502 method 1500 captures the sequence of road images. In an example of step 1550, camera 120 of vehicle 180 captures road images 500(1, 2, 3, . . . , N) and saves them in memory 210 of lane departure warning system 100.

Method 1500 includes step 1500L, which is performed for each road image of the temporal sequence preceding the latest road image, hereinafter, a plurality of previous road images. Step 1500L includes optional steps 1505, 1510, and 1515, non-optional steps 1520, 1525, 1530, and 1540, and optional step 1545.

In optional step 1505, method 1500 identifies at least one of (i) a first region of the latest road image corresponding to an image of a first lane marker on the road and (ii) a second region of the latest road image corresponding to an image of a second lane marker on the road. Step 1505 may include step 1010 of method 1000. In an example of step 1505, marker candidate identifier 222 executes step 1010 of method 1000 to identify marker candidates 631 and 632 of marker-candidate image 600.

In optional step 1510, method 1500 determines a lane-marker interval between the first region and the second region. In an example of step 1510, marker-interval tracker 229 determines lane-marker interval 741, FIG. 7.

In optional step 1515, method 1500 fits at least one of (i) a first line to a portion of the first marker candidate and (ii) a second line to a portion of the second marker candidate. In an example of step 1515, lane verifier 228 fits linear ridge extension 731 to control points 721 and fits linear ridge extension 732 to control points 722.

In step 1520, method 1500 identifies a latest vanishing point candidate as an intersection of (a) a first line fit to a portion of the first marker candidate and (b) a second line fit to a portion of the second marker candidate. When method 1500 includes step 1515, step 1515 yields the first line and the second line of step 1520. In an example of step 1520, vanishing point tracker 221 estimates a latest vanishing point candidate to be location 714, which is the intersection of linear ridge extensions 731 and 732, shown in FIG. 7.

In step 1525, method 1500 determines a distance between the latest vanishing point candidate and a previously-determined vanishing point estimate. In an example of step 1525, vanishing point tracker 221 determines a distance between location 714 and vanishing point estimate 714E.

In step 1530, method 1500 designates the latest vanishing point candidate as vanishing point estimate when (i) a lane-marker interval between the first marker candidate and the second marker candidate is less than a predetermined lane separation range, and (ii) a distance between the latest vanishing point candidate and a previously-determined vanishing point estimate is less than a threshold distance. In an example of step 1530, the first and second marker candidates are linear ridge extensions 731 and 732, respectively (FIG. 7), and the predetermined lane separation range is between $\frac{1}{2}W_{700}$ and $3/2W_{700}$. Linear ridge extensions 731 and 732 are separated by lane-marker interval $W_{741}$, which satisfies $\frac{1}{2}W_{700} < W_{741} < 3/2W_{700}$. In this example of step 1530, vanishing point tracker 221 designates location 714 as vanishing point estimate because (i) $\frac{1}{2}W_{700} < W_{741} < 3/2W_{700}$, and (ii) its distance from previously-determined vanishing point estimate (vanishing point estimate 714E) is less than threshold distance 717.

In step 1540, method 1500 stores, in a memory, the lane-marker interval and coordinates corresponding to the vanishing point estimate. In an example of step 1540, system 100 stores location 714 (as pixel location $(i_{uv}, j_{uv})$) as an extracted lane marker feature 143 within memory 210, for example, within data buffer 212.

In optional step 1545, method 1500 stores the lane-marker interval in a memory. In an example of step 1545, system 100 stores lane-marker interval 741 as an extracted lane marker feature 143 within memory 210, for example, within data buffer 212.

As step 1500L is performed for each of the plurality of previous road image, multiple executions of step 1500L results in (a) a respective plurality of vanishing point estimates and (b) a respective plurality of lane-marker intervals. Step 1500L is, for example, performed on road images 500(1, 2, . . . , N) and yields respective locations 714(1, 2, . . . , N) and respective lane-marker intervals 741(1, 2, . . . , N).

In step 1550, method 1500 determines a refined vanishing point estimate as a statistical average of the stored vanishing point estimates corresponding to the sequence of road images. In an example of step 1550, vanishing point tracker 211 determines a refined vanishing point as a statistical average of locations 714(1, 2, . . . , N). Step 1550 may also include sorting locations 714, stored in data buffer 212, and removing outlier values of locations 714. A statistical average is, for example, a mean, median, mode of a plurality of numerical values.

In step 1560, method 1500 sets the predetermined vanishing point estimate equal to the refined vanishing point estimate. In an example of step 1560 vanishing point tracker 211 sets vanishing point estimate 714E equal to a statistical average of locations 714(1, 2, . . . , N).

When method 1500 includes optional step 1545, it may also include optional steps 1555 and 1565. In step 1555, method 1500 determines a refined lane-marker interval as a statistical average of the stored lane-marker interval corresponding to the sequence of road images. In an example of step 1555, marker-interval tracker 229 determines a refined lane-marker interval as a statistical average of lane-marker intervals 741(1, 2, . . . , N). Step 1550 may also include sorting lane-marker intervals 741, stored in data buffer 212, and removing outlier values of lane-marker intervals 741.

In step 1565, method 1500 sets the predetermined lane separation range equal to the refined lane-marker interval. In an example of step 1565 vanishing point tracker 211 sets lane-marker interval 741 equal to a statistical average of lane-marker intervals 741(1, 2, . . . , N).

Figure 16A:
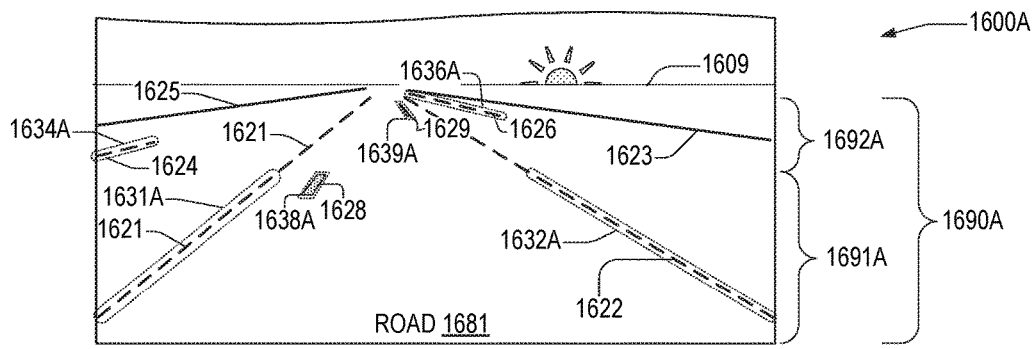
FIGS. 16A and 16B are, respectively, schematics of a previous road image and a latest road image, the processing of which is partly shown in FIG. 16C.
Figure 16B:
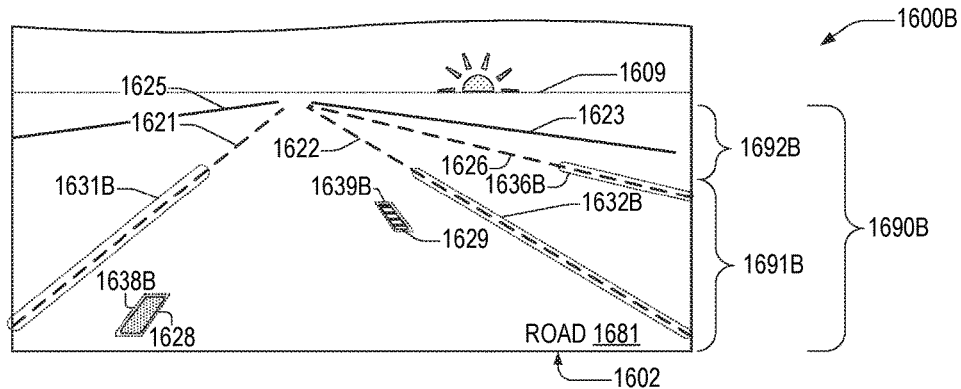

FIGS. 16A and 16B are, respectively, schematics of a previous road image 1600A and a latest road image 1600B of a road 1681. Road images 1600 are for example captured by camera 120 of vehicle 180. Previous road image 1600A and a latest road image 1600B are captured at respective times $t_A$ and $t_B$, $t_B > t_A$ by a vehicle traveling on a road 1681. Road images 1600A and 1600B are for example consecutive road images of within a sequence of road images. Alternatively, road images 1600A and 1600B are not consecutive road images within a sequence of road images. For example, the sequence may include one or more road images, captured between times $t_A$ and $t_B$, that are unfit for lane identification because of obstructions between road 181 and camera 120, such as mud on a windshield of vehicle 180.

Each road image 1600 is an example of road image 132, and includes an imaged section of road 1681 that includes lane markers 1621-1623 and a lane-existing region 1690. Road images 1600A/B each include a near subregion 1691A/B and a far subregion 1692A/B, which are similar to subregions 391 and 392, respectively, of road image 300.

Previous road image 1600A includes a terminated lane marker 1624 that is not present in latest road image 1600B.

Road 1681 includes a lane marker 1626, the image of which is in image regions 1636A and 1636B of road images 1600A and 1600B, respectively. Image region 1636A is in far subregion 1692A of road image 1600A, and hence system 100 does not evaluate its status as a lane marker when processing road image 1600A. Image region 1636B is in near subregion 1691B of road image 1600B, and hence system 100 evaluates its status as a lane marker when processing road image 1600B.

Road 1681 includes a non-lane marker 1628, the image of which is in image regions 1638A and 1638B of road images 1600A and 1600B, respectively. Image region 1638A is in near subregions 1692A and 1692B of road images 1600A and 1600B, respectively. Accordingly, system 100 evaluates its status as a lane marker when processing road images 1600A and 1600B.

Road 1681 includes a non-lane marker 1629, the image of which is in image regions 1639A and 1639B of road images 1600A and 1600B, respectively. Image region 1639A is in far subregion 1692A of road image 1600A, and hence system 100 does not evaluate its status as a lane marker when processing road image 1600A. Image region 1639B is in near subregion 1691B of road image 1600B, and hence system 100 evaluates its status as a lane marker when processing road image 1600B.

Previous road image 1600A includes previously-verified regions 1631A, 1632A, and 1634A that include captured images of lane markers 1621, 1622, and 1624, respectively. Latest road image 1600B includes candidate regions 1631B, 1632B, 1636B, and 1639B. For clarity of illustration, candidate regions in FIG. 16 are illustrated as wider than the respective lane markers or non-lane markers they surround.

While candidate regions 1631A and 1631B both correspond to the same lane marker (1621), they generally will not correspond to the same display pixel locations of their respective road images 1600A and 1600B. This difference of display pixel locations results from, for example, vehicle 180's having at least one of (a) a different transverse position between lane markers 1621 and 1622 and (b) a different angular orientation with respect to one or both of lane markers 1621 and 1622. For example, candidate regions 1631A and 1631B may be non-overlapping as shown in a latest road image 1600B' of FIG. 16C, which, for illustrative purposes, accentuates differences between regions 1631A and 1631B and illustrates where linear extensions of candidate regions 1632A and 1636B intersect a bottom edge 1602 of road image 1600B. Latest road image 1600B' is latest road image 1600B with lane markers 1621, 1621-1625 omitted for clarity of illustration.

Candidate regions 1631A and 1631B (or respective linear extensions 1631A' and 1631B' thereof) are separated by a transverse distance $D_n$ at bottom edge 1602 and by a transverse distance and $D_f$ at horizon 1609. Lane verifier 228 determines that candidate region 1631B corresponds to, that is, aligns with, previously-verified region 1631A when $D_n < \rho_n$ and $D_f < \rho_f$, where $\rho_n$ and $\rho_f$ are predetermined offset thresholds. Lane verifier 228 determines that candidate region 1632B corresponds to (aligns with) previously-verified region 1632A. Previously-verified regions 1631A and 1632A of previous road image 1600A are separated by a predetermined interval 1641 (hereinafter also $w_{16}$) at bottom edge 1602. Offset thresholds $\rho_n$ and $\rho_f$ may correspond to a fraction predetermined interval 1641, e.g., $\rho_n = \rho_f = 0.15 w_{16}$.

Interval 1641 is for example a refined lane-marker interval determined in step 1555 of method 1500. As such, interval 1641 may be computed as an interval (similar to interval 741) between lane markers 1621 and 1622 averaged over a plurality of road images 1600 each having a respective road image region equivalent to regions 1631A,B and 1632A,B. The plurality of road images may correspond to road images captured over a predetermined time period, such as thirty seconds, and may be updated periodically, such as every five minutes. Alternatively, interval 1641 is a continuously-updated moving average of single-image distances between adjacent linear ridge extensions.

Candidate region 1639B is centered with respect to a location 1639Bx on bottom edge 1602. On bottom edge 1602, location 1639Bx is a distance 1649L from region 1631A and a distance 1649R from region 1632A, where the sum of distances 1649L and 1649R equals interval 1641. Lane verifier 228 may determine that candidate region 1639B does not correspond to a newly-verified region (corresponding to a lane marker) because the minimum of distances 1649L and 1649R is less than a threshold distance $\delta \cdot w_{16}$, where factor $\delta = 0.7$, for example.

On bottom edge 1602, candidate region 1636B is a distance 1651 from region 1632A. Lane verifier 228 may determine that candidate region 1636B to be a newly-verified region because distance 1651 exceeds threshold distance $\delta \cdot w_{16}$.

Figure 17:
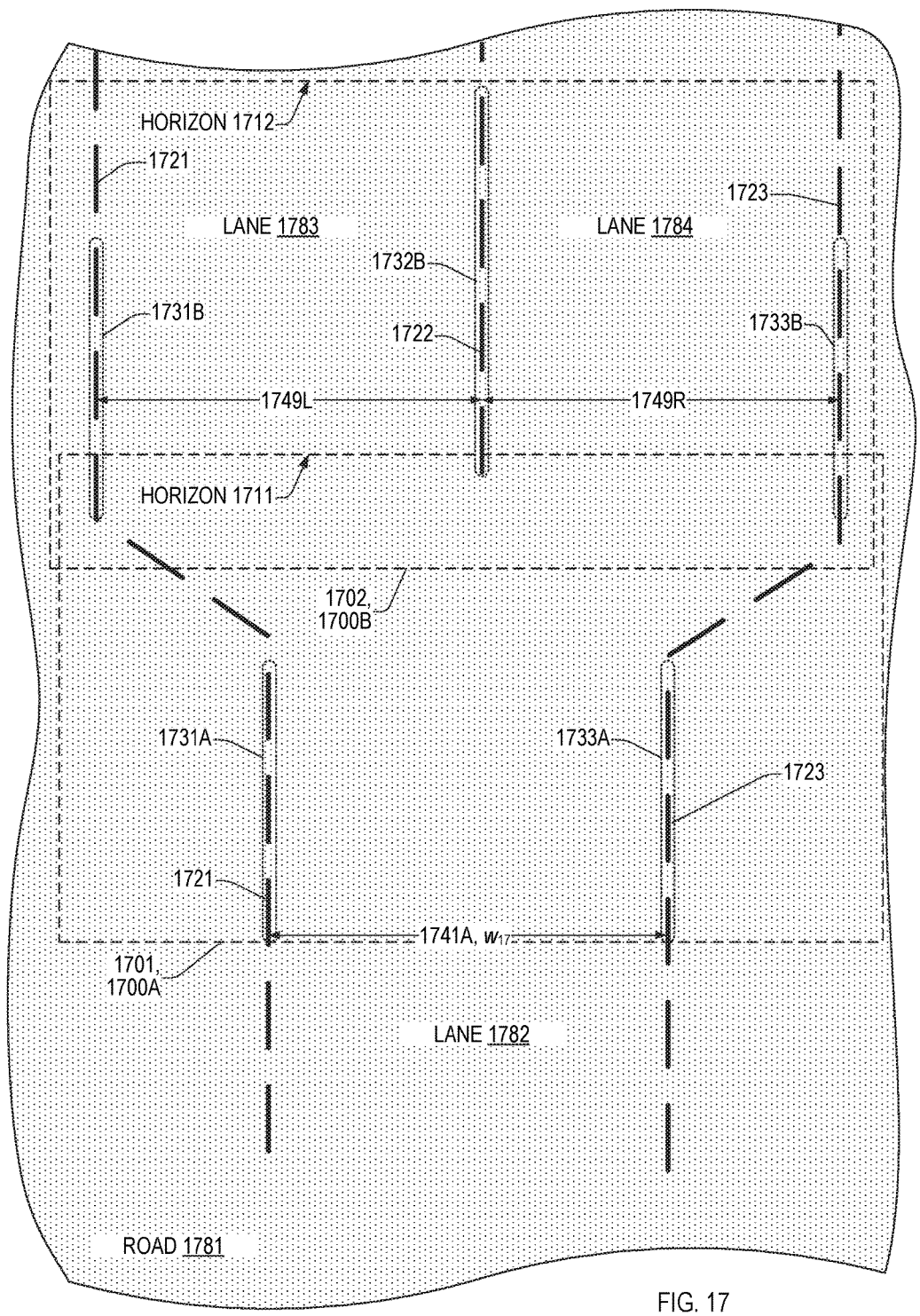
FIG. 17 is a plan view of a road illustrating an exemplary lane-splitting scenario.

FIG. 17 is a plan view of a road 1781 illustrating a lane-splitting scenario where a lane 1782 splits into two lanes 1783 and 1784. Lane markers 1721 and 1723 bound lane 1782; lane markers 1721 and 1722 bound lane 1783; lane markers 1722 and 1723 bound lane 1784. Road 1781 includes two overlapping imaged regions 1701 and 1702 imaged by camera 120 on vehicle 180. Imaged regions 1701 and 1702 also correspond to below-horizon regions of perspective-transformed road images 1700A and 1700B, respectively. That is, perspective-transformed images 1700 are equivalent to regions road images captured by camera 120, similar to road images 1600, but with perspective removed and including only regions below the respective horizon line of each image. Accordingly, road images 1700A and 1700B have respective horizon lines 1711 and 1712.

Previous road image 1700A includes previously-verified regions 1731A and 1733A, which include captured images of lane markers 1721 and 1723, respectively. In road image 1700A, lane marker 1722 appears only near horizon line 1711, and hence lane departure warning system 100 does not classify it as a candidate lane marker. Latest road image 1700B includes candidate regions 1731B, 1732B, and 1733B, which include captured images of lane markers 1721, 1722, and 1723, respectively.

Previously-verified regions 1731A and 1733A of previous road image 1700A are separated by a predetermined interval 1741 (hereinafter also $w_{17}$) at the bottom of road image 1700A. Interval 1741 is similar to interval 1641. In latest road image 1700B, candidate region 1732B is a distance 1749L from region 1731A and a distance 1749R from region 1733B. Lane verifier 228 may determine that candidate region 1732B corresponds to a newly-verified region because the minimum of distances 1749L and 1749R (or equivalently both distances 1749L and 1749R) exceeds than a threshold distance δ·$w_{17}$, where factor δ=0.7, for example.

Figure 18:
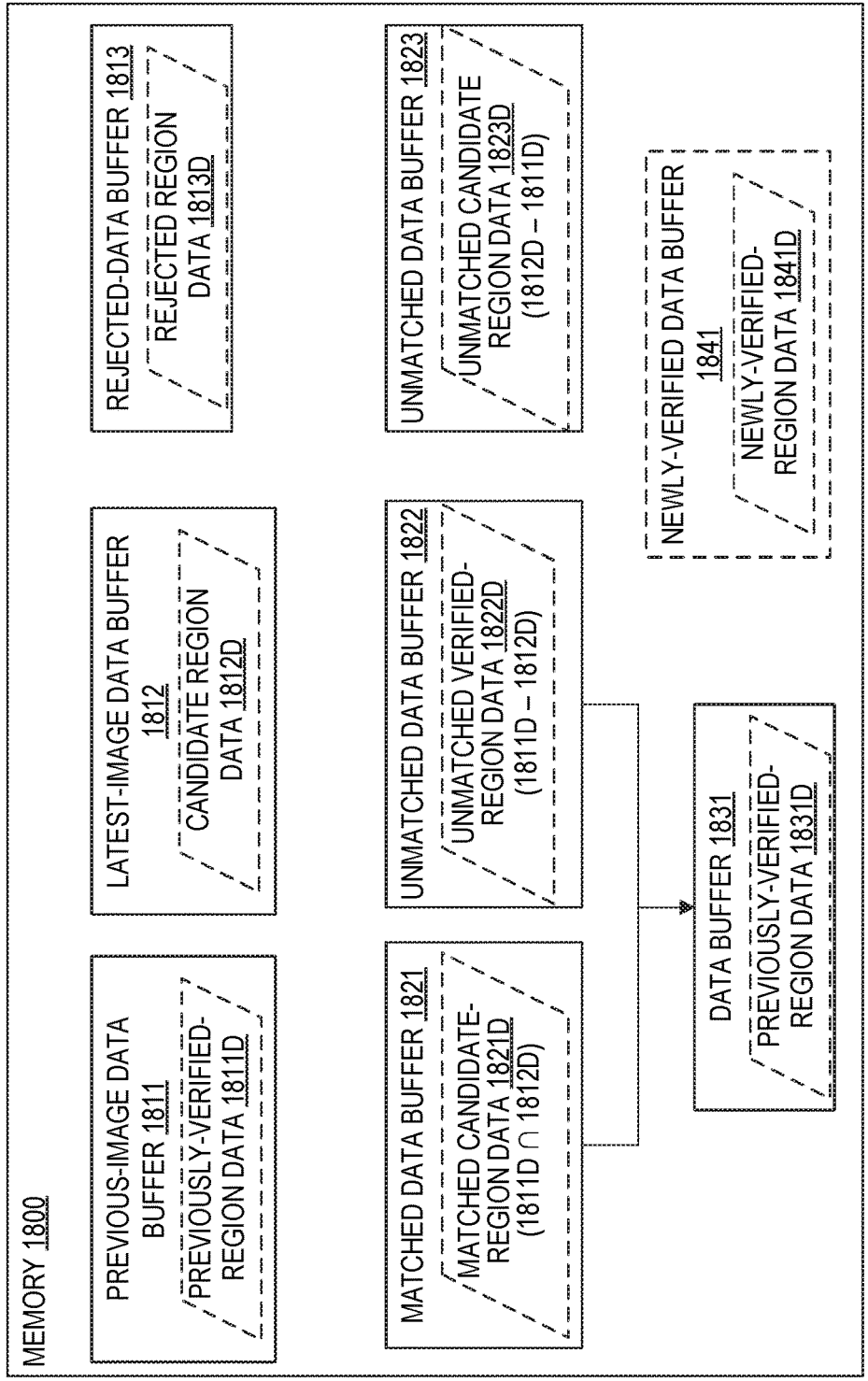
FIG. 18 is a schematic diagram of a memory of the lane departure warning system of FIG. 1, in an embodiment.

FIG. 18 is a schematic diagram of a memory 1800, which is for example part of memory 210 of lane departure warning system 100. Memory 1800 is for example a data buffer and may be a form of volatile memory. Memory 1800 includes data buffers 1811, 1812, 1813, 1821, 1822, 1823, and 1831. Data buffers 1811, 1812, 1813, 1821, 1822, 1823, and 1831 may be part of a single data buffer, wherein data within each buffer 18XX has a feature (e.g., a property, tag, attribute, metadata, etc.) that distinguishes it from data in other buffers.

Previous-image data buffer 1811 stores previously-verified region data 1811D of a one or more previous road images, which for example includes data corresponding to previously-verified regions 1631A, 1632A, and 1634A of previous road image 1600A. Since previously-verified region 1634A corresponds to terminated lane marker 1624, lane departure warning system 100 may delete previously-verified region 1634A from data buffer 1831 after a number road images, e.g., five road images, captured after previous road image 1600A.

Latest-image data buffer 1812 stores candidate region data 1812D, which for example includes data corresponding to candidate regions 1631B, 1632B, 1638B, and 1639B of latest road image 1600B. Rejected-data buffer 1813 stores rejected region data 1813D, which corresponds to rejected regions such as candidate region 1638A of road image 1600A and regions 1638B and 1639B of latest road image 1600B.

Rejected-data buffer 1813 may store rejected regions from a quantity N road images preceding latest road image 1600B. Quantity N is, for example, between five and twenty inclusive such that rejected-data buffer 1813 does not store rejected regions for longer than necessary. System 100 may adjust quantity N or frame rate between successive road images 132 such that rejected regions stored in rejected-data buffer 1813 correspond to a distance along road 132 that is independent of vehicle speed.

Matched data buffer 1821 stores matched candidate-region data 1821D, which is the intersection of data 1811D and 1812D. That is, data 1821D corresponds to candidate regions stored in latest-image data buffer 1812 that match a previously-verified region stored in previous-image data buffer 1811. Examples of such candidate regions include 1631B and 1632B of road image 1600B.

Unmatched data buffer 1822 stores unmatched verified-region data 1822D, which corresponds to previously-verified regions stored in previous-image data buffer 1811 that do not match a candidate region stored in latest-image data buffer 1812. Previously-verified region 1634A (FIG. 16) is an example of such a previously-verified region.

Unmatched data buffer 1823 stores unmatched candidate region data 1823D, which corresponds to candidate regions of a latest road image that lack a match to a previously-verified region of a previous road image. Regions 1636B and 1639B of road image 1600B are examples of such unmatched candidate regions. Region 1732B of road image 1700B is also an example of an unmatched candidate region.

Data buffer 1831 stores previously-verified region data 1831D corresponding to a quantity $N_D$ previous road images, which for example includes data corresponding to previously-verified regions 1631A and 1632A of previous road image 1600A and, in road images preceding road image 1600A, previously-verified regions that correspond to lane markers 1621 and 1622. Quantity $N_D$ is for example five, or may correspond to a number of previous road images representing a time interval of image capture, such that quantity $N_D$ depends on the speed of vehicle 180.

Memory 1800 may also include a newly-verified data buffer 1841, which includes newly-verified region data 1841D. Newly-verified region data 1841D corresponds to candidate regions stored as candidate region data 1812D that include an image of a lane marker on road 181. When camera 120 captures a road image 1600 after capturing road image 1600B, at least part of newly-verified region data 1841D may be stored as previously-verified region data 1811D.

Figure 19:
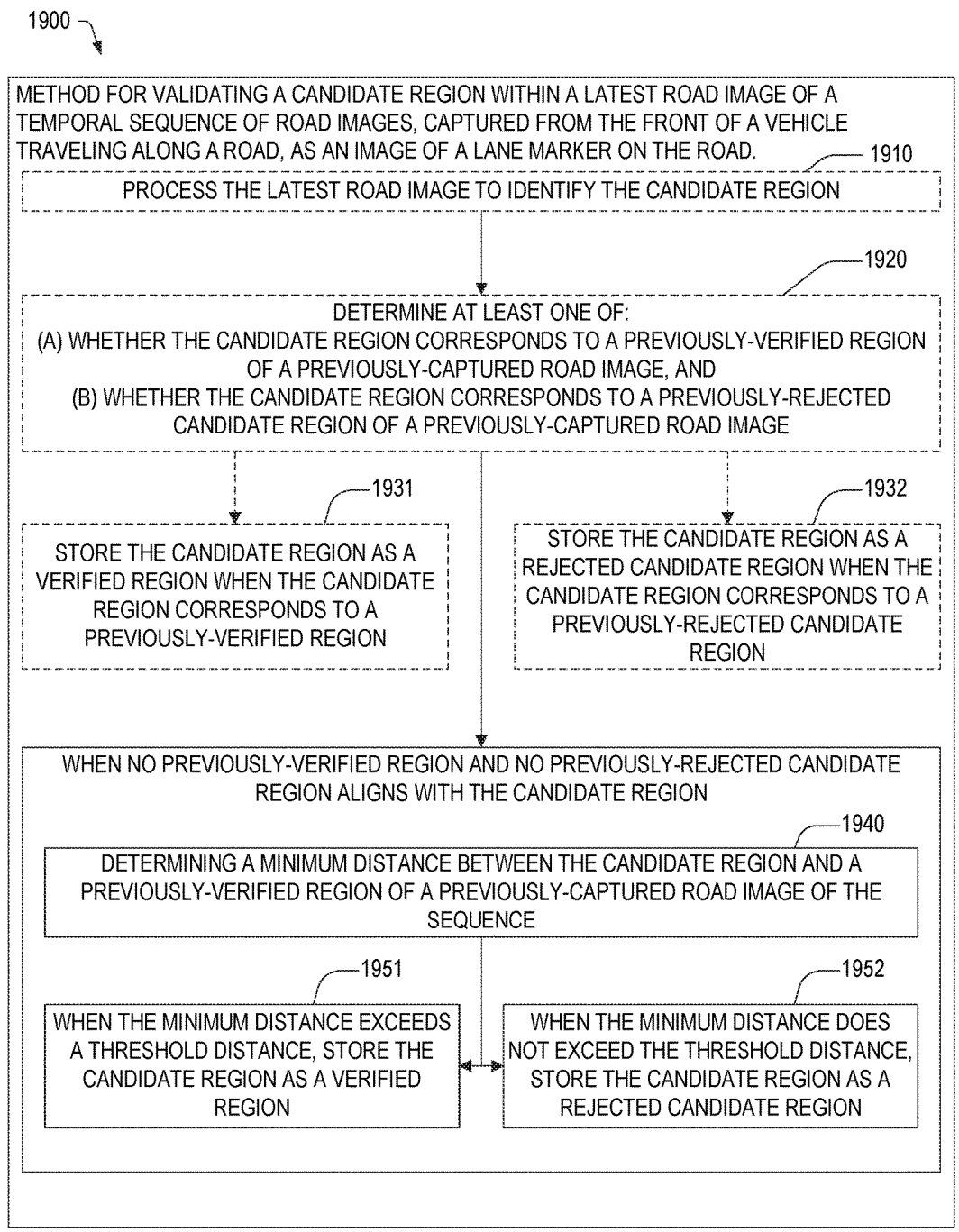
FIG. 19 is a flowchart illustrating an exemplary method for validating a candidate region within a road image, in an embodiment.

FIG. 19 is a flowchart illustrating an exemplary method 1900 for validating a candidate region within a latest road image of a temporal sequence of road images, captured from the front of a vehicle traveling along a road, as an image of a lane marker on the road. Method 1900 is, for example, implemented within one or more aspects of lane departure warning system 100. For example, method 1900 is implemented by image processor 240 executing computer-readable instructions of software 220. FIGS. 16-19 are best viewed together in the following description.

Step 1910 is optional. In optional step 1910, method 1900 processes the latest road image to identify the candidate region. Step 1910 is, for example, identical to step 1010 of method 1000. The candidate region may be stored as candidate region data 1812D within latest-image data buffer 1812. In an example of step 1910, marker candidate identifier 222 identifies candidate regions 1631B, 1632B, 1636B, 1638B, and 1639B within latest road image 1600B.

Step 1920 is optional. In optional step 1920, method 1900 determines at least one of:
(a) whether the candidate region corresponds to a previously-verified region of a previously-captured road image of the sequence, and
(b) whether the candidate region corresponds to a previously-rejected region of a previously-captured road image of the sequence.

Figure 16C:
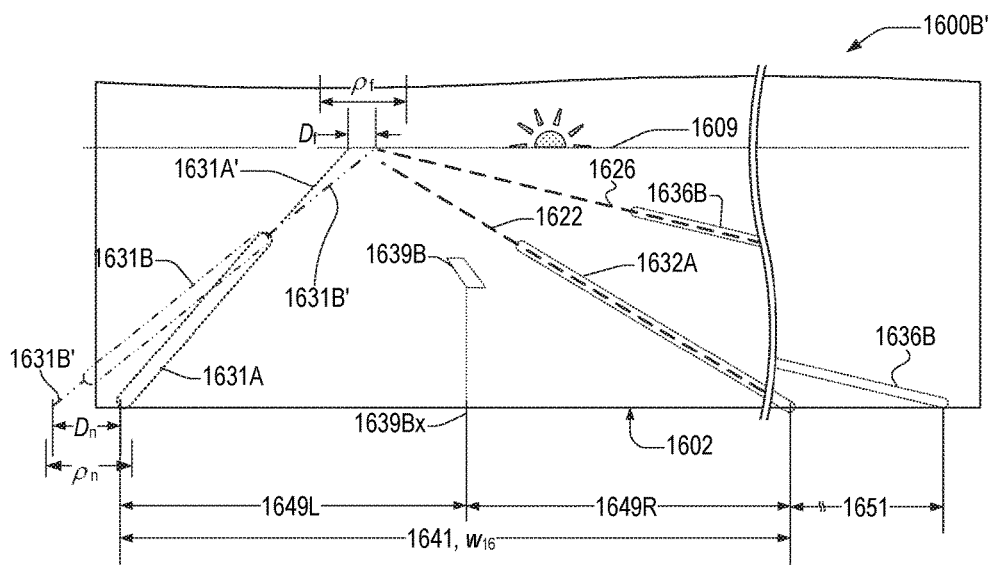

In a first example of step 1920, lane verifier 228 determines that candidate region 1631B corresponds to previously-verified region 1631A, as shown in FIG. 16C and corresponding text. In a second example of step 1920, lane verifier 228 determines that candidate region 1639B does not correspond to previously-verified region of previous road image 1600A. In a third example of step 1920, lane verifier 228 determines that candidate region 1639B corresponds to neither a previously-verified region of previous road image 1600A (e.g., regions 1631A and 1632A) nor previously-rejected region of previous road image 1600A.

Step 1931 is optional. In step 1931, method 1900 stores the candidate region as a verified region when the candidate region corresponds to a previously-verified region. In an example of step 1931, system 100 stores candidate region 1631B in newly-verified data buffer 1841 because it corresponds to previously-verified region 1631A of road image 1600A.

Step 1932 is optional. In step 1932, method 1900 stores the candidate region as a rejected region when the candidate region corresponds to a previously-rejected region. In an example of step 1932, system 100 stores candidate region 1638B in rejected-data buffer 1813 because it corresponds to previously-rejected region 1638A of road image 1600A.

Method 1900 includes steps 1940, 1951, and 1952 when no previously-verified region and no previously-rejected region aligns with the candidate region. In step 1940, method 1900 determines a minimum distance between the candidate region and a previously-verified region of a previously-captured road image of the sequence. In a first example of step 1940, lane verifier 228 determines a minimum distance (distance 1651) between candidate region 1636B and previously-verified regions 1631A and 1632A. In a second example of step 1940, lane verifier 228 determines a minimum distance (one of distances 1749L and 1749R) between candidate region 1732B and previously-verified regions 1731B and 1733B. In a third example of step 1940, lane verifier 228 determines a minimum distance (distance 1649R) between candidate region 1639B and previously-verified regions 1631A and 1632A.

In step 1951, method 1900 stores the candidate region as a verified region when the minimum distance exceeds a threshold distance. In an example of step 1951, system 100 stores candidate region 1636B in newly-verified data buffer 1841 because distance 1651 exceeds threshold distance $\delta \cdot w_{16}$. In a second example of step 1951, system 100 stores candidate region 1732B in newly-verified data buffer 1841 because distances 1749L and 1749R exceed threshold distance $\delta \cdot w_{17}$.

In step 1952, method 1900 stores the candidate region as a rejected region when the minimum distance is less than the threshold distance. In an example of step 1952, system 100 stores candidate region 1639B in rejected-data buffer 1813 because a minimum of distances 1649L and 1649R is less than threshold distance $\delta \cdot w_{16}$.

Figure 20:
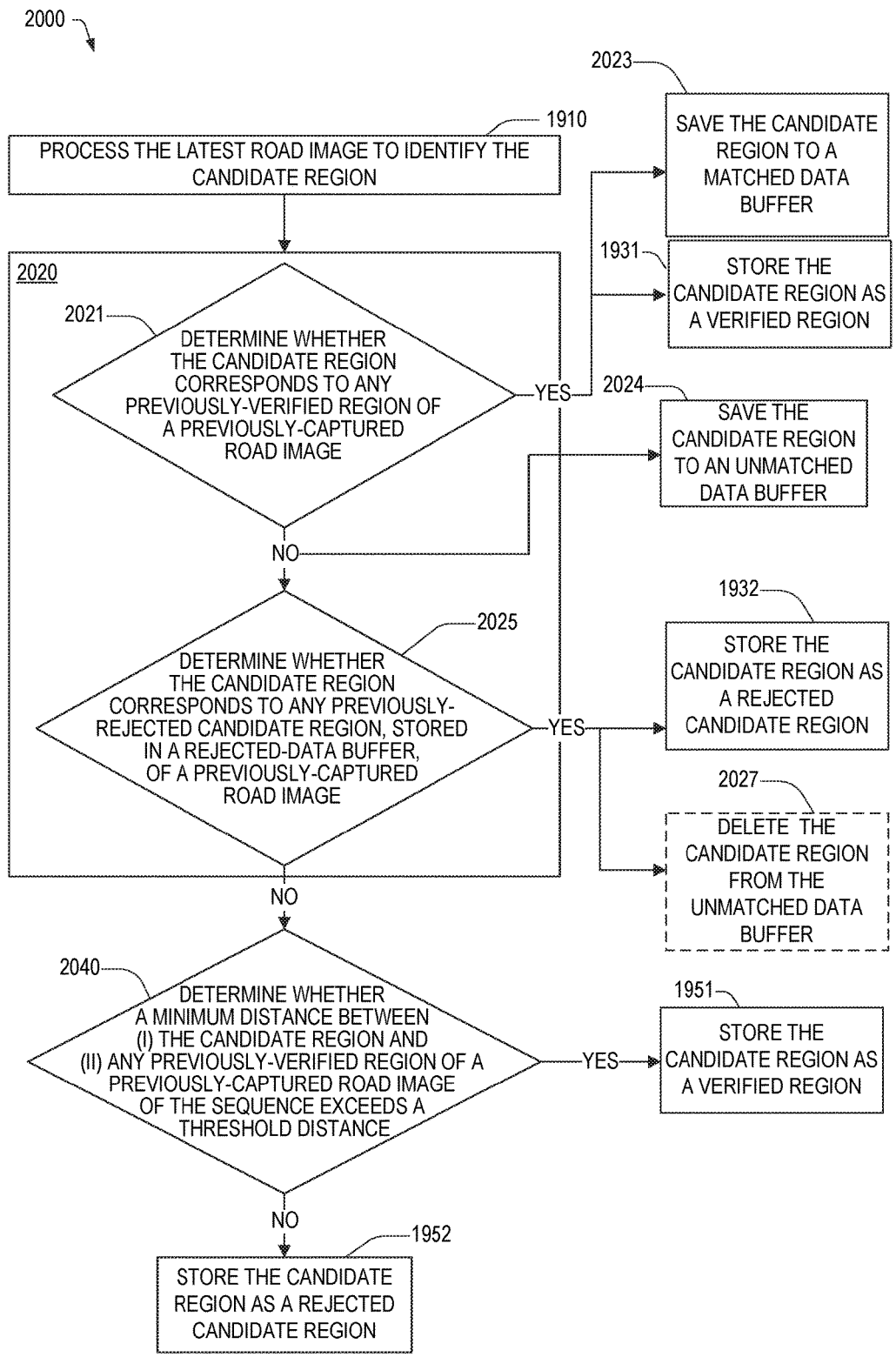
FIG. 20 is a flowchart illustrating an example of the method of FIG. 19.

FIG. 20 is a flowchart illustrating a method 2000, which is an example of method 1900. Method 2000 is, for example, implemented within one or more aspects of lane departure warning system 100. For example, method 2000 is implemented by image processor 240 executing computer-readable instructions of software 220. Method 2000 includes steps 1910, 2020, and 2040. Steps 2020 and 2040 are examples of steps 1920 and 1930, respectively. Step 1910 is described above in the context of method 1900.

Step 2020 is similar to step 1920 of method 1900 and includes steps 2021 and 2025, which are both decisions. If, in step 2021, method 2000 determines that the candidate region corresponds to a previously-verified region of a previously-captured road image of the sequence, then method 2000 continues to steps 1931 and 2023; otherwise method 2000 continues with steps 2024 and 2025. The previously-verified region may be stored in a previous-image data buffer, for example as previously-verified-region data 1811D within previous-image data buffer 1811. Step 2025 may precede step 2021 without departing from the scope hereof.

In one example of step 2021, lane verifier 228 determines that candidate region 1631B corresponds to previously-verified region 1631A, and method 2000 continues to steps 1931 and 2023. Step 1931 is described in the context of method 1900.

In step 2023, method 2000 saves, to a matched data buffer, the candidate region that corresponds to a previously-verified region. In an example of step 2023, system 100 saves candidate regions 1631B and 1632B to matched data buffer 1821 as matched candidate-region data 1821D. In step 2023, system 100 may equivalently save previously-verified regions 1631A and 1632A to matched buffer 1821 as part of matched candidate-region data 1821D.

In a second example of step 2020, lane verifier 228 determines that candidate regions 1638B and 1639B do not correspond to previously-verified region of previous road image 1600A, and method 2000 continues to steps 2024 and 2025.

In step 2024, method 2000 saves the candidate region to an unmatched data buffer. In an example of step 2024, system 100 saves candidate regions 1638B and 1639B to unmatched data buffer 1823 as data 1823D If, in step 2025, method 2000 determines that the candidate region corresponds to the previously-rejected region of a previously-captured road image of the sequence, then method 2000 proceeds to steps 1932 and 2027; otherwise method 2000 continues with step 2040. The previously-rejected regions are, for example, stored in a data buffer such as rejected-data buffer 1813.

In a first example of step 2025, lane verifier 228 determines that candidate region 1638B corresponds to a previously-rejected region 1638A of previous road image 1600A, and method 2000 continues to step 1932 and, optionally, step 2027. Step 1932 is described in the context of method 1900.

In optional step 2027, method 2000 deletes the candidate region from the unmatched data buffer. In an example of step 2027, system 100 deletes candidate region 1638B from unmatched data buffer 1823.

In a second example of step 2025, lane verifier 228 determines that candidate region 1639B does not correspond to a previously-rejected region of previous road image 1600A, and method 2000 continues to step 2040.

Step 2040 is a decision, and is similar to step 1940 of method 1900. If, in step 2040, method 2000 determines that a minimum distance between (i) the candidate region and (ii) the previously-verified region of a previously-captured road image of the sequence exceeds a threshold distance, then method 2000 continues to step 1951; otherwise method 2000 continues to step 1952.

In an example of step 2040, lane verifier 228 determines that a minimum distance (distance 1649R) between candidate region 1639B and previously-verified regions 1631A and 1632A is less than threshold distance $0.7w_{16}$. In this example, method 2000 continues to step 1952, in which system 100 stores candidate region 1639B in rejected-data buffer 1813 because a minimum of distances 1649L and 1649R is less than threshold distance $\delta \cdot w_{16}$.

In a second example of step 2040, lane verifier 228 determines a minimum distance (distance 1651) between candidate region 1636B and previously-verified regions 1631A and 1632A exceeds threshold distance $\delta \cdot w_{16}$. In this example, method 2000 continues to step 1951, in which system 100 stores candidate region 1636B in newly-verified data buffer 1841.

In a third example of step 2040, lane verifier 228 determines a minimum distance (one of distances 1749L and 1749R) between candidate region 1732B and previously-verified regions 1731B and 1733B exceeds threshold distance $\delta \cdot w_{17}$. In this example, method 2000 continues to step 1951, in which system 100 stores candidate region 1732B in newly-verified data buffer 1841.

Combinations of Features.

Features described above as well as those claimed below may be combined in various ways without departing from the scope hereof. The following examples illustrate some possible, non-limiting combinations:

"(A1)" denotes a method for validating a candidate region as including an image of a lane marker on the road. The candidate region is identified within a latest road image of a temporal sequence of road images captured from the front of a vehicle traveling along a road. When no previously-verified region and no previously-rejected region aligns with the candidate region, method (A1) determines a minimum distance between the candidate region and a previously-verified region of a previously-captured road image of the sequence. When the minimum distance exceeds a threshold distance, method (A1) stores the candidate region as a verified region. When the minimum distance is less than the threshold distance, method (A1) stores the candidate region as a rejected region.

(A2) The method denoted by (A1) may further include storing the candidate region as a verified region when the candidate region corresponds to a previously-verified region.

(A3) Any method denoted by one of (A1) and (A2) may further include storing the candidate region as a rejected region when the candidate region corresponds to a previously-rejected region.

(A4) Any method denoted by one of (A1) through (A3) may further include processing the latest road image to identify the candidate region and determining at least one of (d1) whether the candidate region corresponds to a previously-verified region of a previously-captured road image of the sequence, and (d2) whether the candidate region corresponds to a previously-rejected region of a previously-captured road image of the sequence.

(A5) In any method denoted by (A4), the step of processing may include: (a) identifying a ridge feature within the latest road image to generate a ridge-feature image, and (b) identifying a plurality of lines that each at least partially overlap the ridge feature.

(A6) In any method denoted by (A5), the step of processing may further include conjoining the plurality of lines to identify the candidate region.

(A7) In any method denoted by (A6), the step of conjoining may include, in a blank image having a plurality of pixels each having (i) the same pixel value and (ii) a pixel coordinate in the blank image: (a) changing pixel values of a plurality of lane-candidate pixels each having respective pixel coordinates corresponding to one of the plurality of lines, and (b) executing a morphological operator on the plurality lane-candidate lane pixels.

(A8) In any method denoted by one of (A5) through (A7), the step of identifying a ridge feature may include, for each of a plurality of locations of the latest road image: (i) computing a first horizontal image gradient partially based on a first image intensity representative of a first image region entirely to the left of the location, (ii) computing a second horizontal image gradient partially based on a second image intensity representative of a second image region entirely to the right of the location, and (iii) determining whether the location is part of a ridge feature based on the first horizontal image gradient and the second horizontal image gradient.

(A9) In any method denoted by (A8), the step of identifying may further include determining, based on a vertical position of the location, a horizontal width of at least one of (a) the first image region, (b) the second image region, and (c) the ridge feature.

(A10) In any method denoted by one of (A8) and (A9), the step of identifying may further include applying a continuity threshold operation to the ridge-feature image to reject ridge features not corresponding to a lane marker.

(A11) In any method denoted by one of (A5) through (A10), in which the latest road image including a lane-existing region having a near subregion including an imaged road region nearer to the vehicle, one of the plurality of lines may be fit to a plurality of near control points in the ridge-feature image corresponding to the candidate region, the near control points being in a second near subregion of the ridge-feature image corresponding to the near subregion of the latest road image.

(A12) Any method denoted by one of (A1) through (A11) may further include, when the minimum distance is less than the threshold distance, at least one of (i) storing the candidate region as a rejected region, and (ii) saving the candidate region to a data buffer that also includes one or more previously-rejected regions of the temporal sequence of road images.

"(B1)" denotes a method for determining a refined vanishing point estimate within a latest road image of a temporal sequence of road images. Each road image is captured from the front of a vehicle traveling along a road. Method (B1) includes, for each road image of the temporal sequence, the following steps: (a) fitting a first line to a first region of the latest road image corresponding to a first lane marker on the road; (b) fitting a second line to a second region of the latest road image corresponding to a second lane marker on the road; (c) determining a lane-marker interval between the first region and the second region; (d) identifying a vanishing point candidate as an intersection of the first line and the second line; (e) determining a distance between the vanishing point candidate and a previously-determined vanishing point estimate; (f) storing the vanishing point candidate as a vanishing point estimate when (1) the lane-marker interval is within a predetermined interval based on a previously-determined lane-marker interval, and (2) the distance is less than a threshold distance; and (g) storing, in a memory, coordinates corresponding to the vanishing point estimate. Method (B1) also includes a step of determining a refined vanishing point estimate as a statistical average of the stored vanishing point estimates; and a step of setting the previously-determined vanishing point estimate equal to the refined vanishing point estimate.

(B2) The method denoted by (B1) may further include, for each road image of the sequence, steps of (i) storing the lane-marker interval in a memory, (ii) determining a refined lane-marker interval as a statistical average of the stored lane-marker intervals corresponding to the temporal sequence of road images, and (iii) setting the previously-determined vanishing point estimate equal to the refined lane-marker interval.

"(C1)" denotes a lane departure warning system for validating a candidate region as including an image of a lane marker on the road. The candidate region is identified within a latest road image of a temporal sequence of road images captured from the front of a vehicle traveling along a road. The system includes a memory and an image processor. The memory stores non-transitory computer-readable instructions and adapted to store the road image. The image processor is adapted to execute the instructions to, when no previously-verified region and no previously-rejected region aligns with the candidate region: (i) determine a minimum distance between the candidate region and a previously-verified region of a previously-captured road image of the sequence, (ii) when the minimum distance exceeds a threshold distance, store the candidate region as a verified region, and (iii) when the minimum distance is less than the threshold distance, store the candidate region as a rejected region.

(C2) In the lane departure warning system denoted by (C1), the image processor may further be adapted to execute the instructions to: store the candidate region as a verified region when the candidate region corresponds to a previously-verified region.

(C3) In any lane departure warning system denoted by one of (C1) and (C2), the image processor may be further adapted to execute the instructions to store the candidate region as a rejected region when the candidate region corresponds to a previously-rejected region.

(C4) In any lane departure warning system denoted by one of (C1) through (C3), the image processor may be further adapted to process the latest road image to identify the candidate region, and determine at least one of (d1) whether the candidate region corresponds to a previously-verified region of a previously-captured road image of the sequence, and (d2) whether the candidate region corresponds to a previously-rejected region of a previously-captured road image of the sequence.

"(D1)" denotes a lane departure warning system for determining a refined vanishing point estimate within a latest road image of a temporal sequence of road images captured from the front of a vehicle traveling along a road. The system includes a memory and an image processor. The memory stores non-transitory computer-readable instructions is adapted to store the road image. The image processor is adapted to execute the instructions to, for each road image of the temporal sequence, execute steps (a) through (g) of the method denoted by (B1). The image processor also adapted to execute the instructions to (i) determine a refined vanishing point estimate as a statistical average of the stored vanishing point estimates, and (ii) set the previously-determined vanishing point estimate equal to the refined vanishing point estimate.

(D2) In a method denoted by (D1), the image processor may be further adapted to execute the instructions to, for each road image of the temporal sequence: store the lane-marker interval in the memory; determine a refined lane-marker interval as an average of the stored lane-marker intervals corresponding to the temporal sequence of road images; and set the previously-determined vanishing point estimate equal to the refined lane-marker interval.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for validating a candidate region, for use in an automobile lane-detection system, identified within a latest road image of a temporal sequence of road images captured from the front of a vehicle traveling along a road, as including an image of a lane marker on the road, the method comprising the steps of:
   when no previously-verified region and no previously-rejected region aligns with the candidate region:
      determining a minimum distance between the candidate region and a previously-verified region of a previously-captured road image of the sequence;
      when the minimum distance exceeds a threshold distance, storing the candidate region as a verified region; and
      when the minimum distance is less than the threshold distance, storing the candidate region as a rejected region.

2. The method of claim 1, further comprising storing the candidate region as a verified region when the candidate region corresponds to a previously-verified region.

3. The method of claim 1, further comprising storing the candidate region as a rejected region when the candidate region corresponds to a previously-rejected region.

4. The method of claim 1, further comprising:
   processing the latest road image to identify the candidate region;
   determining at least one of (d1) whether the candidate region corresponds to a previously-verified region of a previously-captured road image of the sequence, and (d2) whether the candidate region corresponds to a previously-rejected region of a previously-captured road image of the sequence.

5. The method of claim 4, the step of processing comprising:
   identifying a ridge feature within the latest road image to generate a ridge-feature image; and
   identifying a plurality of lines each at least partially overlapping the ridge feature.

6. The method of claim 5, the step of processing further comprising conjoining the plurality of lines to identify the candidate region.

7. The method of claim 6, the step of conjoining comprising, in a blank image having a plurality of pixels each having (i) the same pixel value and (ii) a pixel coordinate in the blank image:
   changing pixel values of a plurality of lane-candidate pixels each having respective pixel coordinates corresponding to one of the plurality of lines;
   executing a morphological operator on the plurality lane-candidate lane pixels.

8. The method of claim 5, the step of identifying a ridge feature comprising:
   for each of a plurality of locations of the latest road image:
      computing a first horizontal image gradient partially based on a first image intensity representative of a first image region entirely to the left of the location;
      computing a second horizontal image gradient partially based on a second image intensity representative of a second image region entirely to the right of the location; and
      determining whether the location is part of a ridge feature based on the first horizontal image gradient and the second horizontal image gradient.

9. The method of claim 8, the step of identifying further comprising determining, based on a vertical position of the location, a horizontal width of at least one of (a) the first image region, (b) the second image region, and (c) the ridge feature.

10. The method of claim 8, the step of identifying further comprising applying a continuity threshold operation to the ridge-feature image to reject ridge features not corresponding to a lane marker.

11. The method of claim 5, the latest road image including a lane-existing region having a near subregion including an imaged road region nearer to the vehicle,
   one of the plurality of lines being fit to a plurality of near control points in the ridge-feature image corresponding to the candidate region, the near control points being in a second near subregion of the ridge-feature image corresponding to the near subregion of the latest road image.

12. The method of claim 1, further comprising, when the minimum distance is less than the threshold distance, at least one of (i) storing the candidate region as a rejected region, and (ii) saving the candidate region to a data buffer that also includes one or more previously-rejected regions of the temporal sequence of road images.

13. A method for determining a refined vanishing point estimate for use in an automobile lane-detection system and within a latest road image of a temporal sequence of road images captured from the front of a vehicle traveling along a road, the method comprising:

for each road image of the temporal sequence:
fitting a first line to a first region of the latest road image corresponding to a first lane marker on the road;
fitting a second line to a second region of the latest road image corresponding to a second lane marker on the road;
determining a lane-marker interval between the first region and the second region;
identifying a vanishing point candidate as an intersection of the first line and the second line;
determining a distance between the vanishing point candidate and a previously-determined vanishing point estimate;
storing the vanishing point candidate as a vanishing point estimate when (i) the lane-marker interval is within a predetermined interval based on a previously-determined lane-marker interval, and (ii) the distance is less than a threshold distance;
storing, in a memory, coordinates corresponding to the vanishing point estimate;
determining a refined vanishing point estimate as a statistical average of the stored vanishing point estimates; and
setting the previously-determined vanishing point estimate equal to the refined vanishing point estimate.

14. The method of claim 13, further comprising:
for each road image of the sequence, storing the lane-marker interval in a memory;
determining a refined lane-marker interval as a statistical average of the stored lane-marker intervals corresponding to the temporal sequence of road images; and
setting the previously-determined vanishing point estimate equal to the refined lane-marker interval.

15. A lane departure warning system for validating a candidate region, identified within a latest road image of a temporal sequence of road images captured from the front of a vehicle traveling along a road, as including an image of a lane marker on the road, the system comprising:
a memory storing non-transitory computer-readable instructions and adapted to store the road image;
an image processor adapted to execute the instructions to, when no previously-verified region and no previously-rejected region aligns with the candidate region:
determine a minimum distance between the candidate region and a previously-verified region of a previously-captured road image of the sequence;
when the minimum distance exceeds a threshold distance, store the candidate region as a verified region; and
when the minimum distance is less than the threshold distance, store the candidate region as a rejected region.

16. The lane departure warning system of claim 15, the image processor further adapted to execute the instructions to store the candidate region as a verified region when the candidate region corresponds to a previously-verified region.

17. The lane departure warning system of claim 15, the image processor further adapted to execute the instructions to store the candidate region as a rejected region when the candidate region corresponds to a previously-rejected region.

18. The lane departure warning system of claim 15, the image processor further adapted to execute the instructions to:
process the latest road image to identify the candidate region;
determine at least one of (d1) whether the candidate region corresponds to a previously-verified region of a previously-captured road image of the sequence, and (d2) whether the candidate region corresponds to a previously-rejected region of a previously-captured road image of the sequence.

19. A lane departure warning system for determining a refined vanishing point estimate within a latest road image of a temporal sequence of road images captured from the front of a vehicle traveling along a road, the system comprising:
a memory storing non-transitory computer-readable instructions and adapted to store the road image;
an image processor adapted to execute the instructions to, for each road image of the temporal sequence:
fit a first line to a first region of the road image corresponding to a first lane marker on the road;
fit a second line to a second region of the latest road image corresponding to a second lane marker on the road;
determine a lane-marker interval between the first region and the second region;
identify a vanishing point candidate as an intersection of the first line and the second line;
determine a distance between the vanishing point candidate and a previously-determined vanishing point estimate;
store the vanishing point candidate as a vanishing point estimate when (i) the lane-marker interval is within a predetermined interval based on a previously-determined lane-marker interval, and (ii) the distance is less than a threshold distance;
store, in a memory, coordinates corresponding to the vanishing point estimate;
determine a refined vanishing point estimate as a statistical average of the stored vanishing point estimates; and
set the previously-determined vanishing point estimate equal to the refined vanishing point estimate.

20. The lane departure warning system of claim 19, the image processor further adapted to execute the instructions to:
for each road image of the temporal sequence, store the lane-marker interval in the memory;
determine a refined lane-marker interval as an average of the stored lane-marker intervals corresponding to the temporal sequence of road images; and
set the previously-determined vanishing point estimate equal to the refined lane-marker interval.

* * * * *